United States Patent [19]

Holmes

[11] Patent Number: 5,262,769
[45] Date of Patent: Nov. 16, 1993

[54] PROGRAMMED SCANNING PAGER RECEIVER

[75] Inventor: Roy L. Holmes, Overton, Nebr.

[73] Assignee: Reach Electronics, Inc., Lexington, Nebr.

[21] Appl. No.: 895,633

[22] Filed: Jun. 9, 1992

Related U.S. Application Data

[63] Continuation of Ser. No. 513,438, Apr. 23, 1990, abandoned.

[51] Int. Cl.$^5$ ............................................. H04Q 1/00
[52] U.S. Cl. ........................ 340/825.03; 340/825.44; 455/71; 455/161.2; 455/166.2; 455/186.1
[58] Field of Search ................ 340/825.03, 825.44, 340/825.48; 455/185.1, 186.1, 161.1, 161.2, 165.1, 255, 71, 166.1, 166.2

[56] References Cited

U.S. PATENT DOCUMENTS

| | | | |
|---|---|---|---|
| H610 | 5/1989 | Focarile et al. | 455/166 X |
| 3,671,870 | 6/1972 | Wellhausen. | |
| 3,845,394 | 10/1974 | Hamada. | |
| 4,079,420 | 3/1978 | Mogi et al. | 358/195 |
| 4,181,893 | 1/1980 | Ehmke. | |
| 4,398,192 | 8/1983 | Moore et al. | 340/825.44 |
| 4,461,036 | 7/1984 | Williamson et al. | 455/165 |
| 4,644,347 | 2/1987 | Lucas et al. | 340/825.44 |
| 4,703,520 | 10/1987 | Rozanski, Jr. et al. | 455/75 |
| 4,978,944 | 12/1990 | Audros et al. | 455/71 X |

FOREIGN PATENT DOCUMENTS

| | | |
|---|---|---|
| 171071 | 12/1986 | European Pat. Off.. |
| 3034155 | 3/1982 | Fed. Rep. of Germany ...... 455/161 |
| 52-45814 | 11/1977 | Japan .................................. 455/165 |
| 56-136020 | 10/1981 | Japan. |
| 57-95720 | 6/1982 | Japan. |
| 58-100528 | 6/1983 | Japan. |
| 59-112719 | 6/1984 | Japan. |
| 60-98714 | 6/1985 | Japan. |
| 60-100817 | 6/1985 | Japan. |
| 60-148215 | 8/1985 | Japan. |
| 60-233923 | 11/1985 | Japan. |
| 2006577 | 5/1979 | United Kingdom. |

OTHER PUBLICATIONS

M. Ramm, "A New Tuning System for Low Voltage Applications," IEEE Transactions on Consumer Electronics, vol. CE-33 No. 3 Aug. 1987, pp. 333-335.

Primary Examiner—Donald J. Yusko
Assistant Examiner—Brian Zimmerman
Attorney, Agent, or Firm—Emrich & Dithmar

[57] ABSTRACT

A pager receiver includes an addressable data memory for storing sets of digital frequency data for application to a frequency synthesizer which responds to each set of frequency data to tune the pager receiver to a channel or frequency identified by the frequency data, and a process controller which controls both the storing in the memory of the frequency data identifying a plurality of channels or frequencies and the reading out of the frequency data one set at a time in sequence in searching for a paging signal being transmitted to the paging receiver. The pager receiver is operable in a preprogrammed mode in which frequency data which identifies a plurality of channels is supplied to the pager receiver from an external source with the pager receiver scanning only those channels for which frequency data is stored in the memory or in an all channel scanning mode in which the pager receiver rapidly scans all available pager channels or frequencies and stores in the memory frequency data which identifies only those channels for which acceptable signal level and system code is detected, the pager receiver then scanning only those channels for which frequency data is stored in memory.

22 Claims, 16 Drawing Sheets

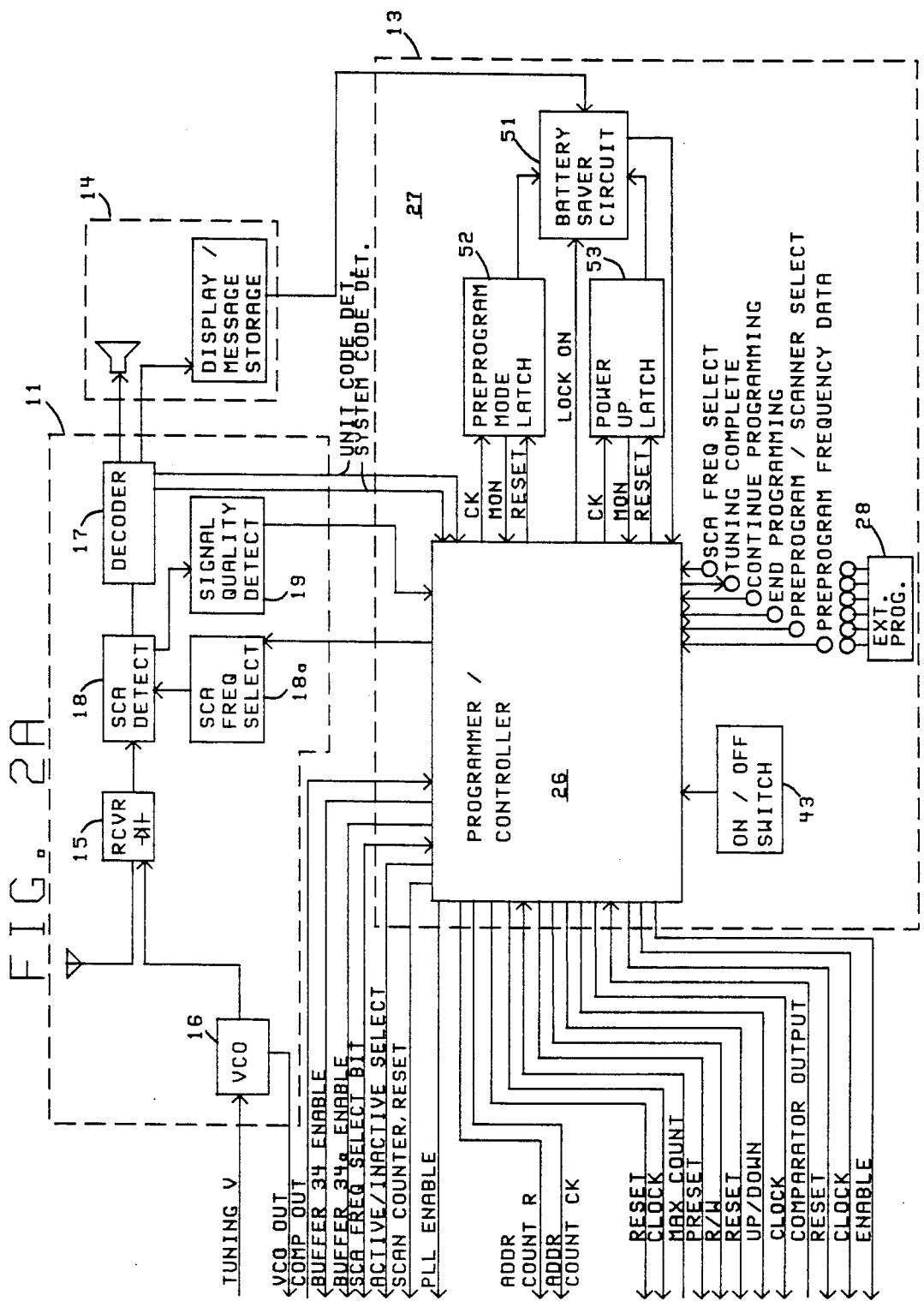

PROGRAMMED SCANNING PAGER RECEIVER

This is a continuation of application Ser. No. 07/513,438, filed Apr. 23, 1990 now abandoned.

BACKGROUND OF THE INVENTION

This invention relates to pager receivers, and more particularly to scanning type pager receivers.

Various arrangements have been proposed for tuning pager receivers. For example, paging receivers produced in the past include a crystal oscillator which generates a reference signal the frequency of which is divided down to a relatively low frequency. These high frequency dividers contribute significantly to shortening the lifetime of the battery which energizes the circuits of the pager receiver. On the other hand, the analog tuned version of this invention uses low current digital to analog converters which significantly improves battery lifetime. Consequently, tuning systems for pager receivers that do not employ a crystal oscillator are desirable.

In one arrangement, the tuning system includes an adjustable bias supply which is coupled to a voltage controlled receiver tuning circuit. The tuning system coarse tunes the pager receiver to the desired receive channel or frequency. Fine tuning is provided by a correction voltage which is coupled from the frequency detector to the adjustable bias circuit. One disadvantage of this type of tuning system is that it must provide a wide enough range on the correction voltage to provide compensation for all component aging and temperature drift. However, providing a frequency correction range sufficiently wide to correct for all component aging and temperature drift could cause the receiver to mistune, pulling in as many as three channels away from the desired tuning channel, for example.

There is another consideration, if the receiver is designed to scan multiple channels for example it may be configured to scan in sequence all 100 channels in the pager FM frequency band. Thus, whenever loss of received signal occurs, the receiver will scan to the next higher system channel immediately. However, if the next system channel were two channels below the present received channel, the pager receiver would have to scan 98 channels before reading the next channel active for the pager receiver. Consequently, messages might be missed during the process of scanning to locate the next available channel for the pager system.

A further possible disadvantage of a scanning pager receiver is that it may not be compatible with tone and voice paging arrangements currently in use. Scanning pager receivers available today are configured to seek channels continuously modulated with system code. Thus, each time the pager receiver seeks an active channel, the pager receiver will scan each of the 100 pager channels in sequence, looking for a system code as each channel is scanned. This could result in loss of a paging signal being transmitted over a channel that is widely separated from the channel at which the pager receiver begins its scanning operation.

Thus, it would be desirable to have a pager receiver that can rapidly determine those channels for a given system on which a detectable signal is present. It would be desirable also to have a pager receiver which minimizes power requirements to enhance battery lifetime for the pager receiver. It would be desirable also to have a scanning paging receiver which is compatible with tone and voice paging systems that are currently available. Moreover, it would be desirable to have a pager receiver including a tuning system which minimizes the time required to seek and lock to a receivable signal channel, thereby minimizing power requirements, and which automatically and continuously adjusts for small variations in frequency tuning thereby compensating for component aging and temperature drift.

SUMMARY OF THE INVENTION

The present invention provides a pager receiver for receiving paging signals on a plurality of channels comprising signal receiving means including tuning circuit means tunable to the channels and signal detecting means for detecting paging signals on a channel to which said tuning circuit means is tuned; data memory means for storing a plurality of frequency data words identifying predetermined ones of the channels; control means for controlling said data memory means to read out the frequency data words in sequence for enabling said tuning circuit means to be tuned to the predetermined channels in sequence, said control means being responsive to said signal detecting means to stop reading out the frequency data words when a paging signal is detected; and signaling means responsive to the detected paging signal for providing an indication that a paging signal has been detected.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIGS. 2 and 2A, when arranged in side-by-side relation, are a detailed block diagram for an embodiment of the paging receiver illustrated in FIG. 1 including a tuning circuit having locked loop;

DESCRIPTION OF PREFERRED EMBODIMENTS

Figure 1:
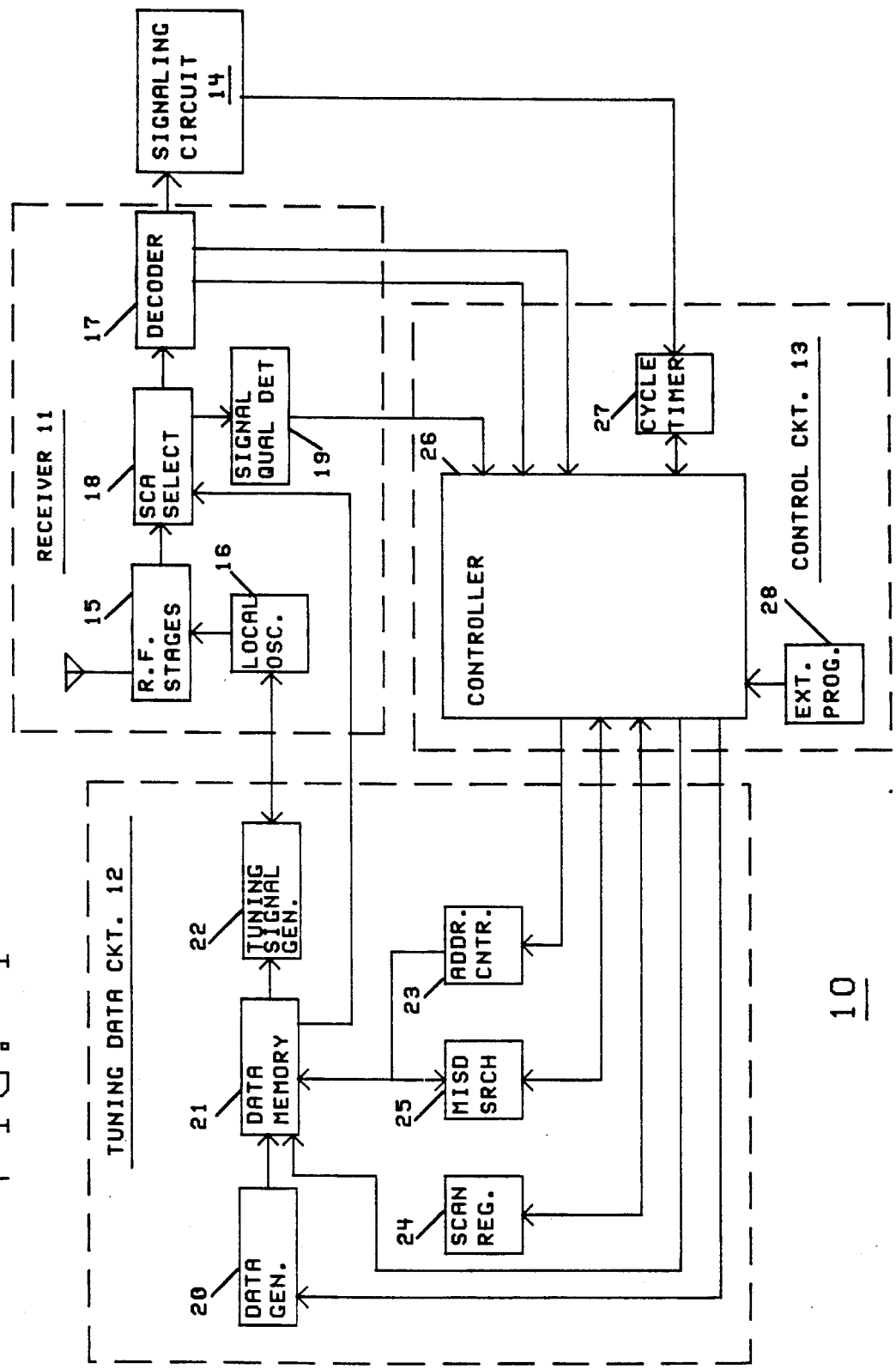
FIG. 1 is a block diagram of a pager receiver provided by the present invention.

Referring to FIG. 1, the pager receiver 10 provided by the present invention includes a receiver 11, a tuning data circuit 12, a control circuit 13, and a signaling circuit 14. The receiver 11 responds to tuning signals generated by the tuning data circuit 12 and tunes the pager receiver to a pager channel over which a message is being transmitted. In the exemplary embodiment, the pager channels comprise the 100 FM radio channels. The receiver 11 detects and decodes paging signals incoming on the channel to which the pager receiver is tuned and provides a control output to the signaling circuit 14. The signaling circuit 14 produces an indication, such as an audible alarm, to alert the person using that pager receiver that a paging signal has been detected and that a message is about to be received or has been received and stored by the pager receiver. The signaling circuit 14 comprises suitable circuits to store the received message or for providing an audible output signal for the pager user to hear.

As will be shown, the pager receiver 10 is selectively operable in either a preprogrammed mode or an all channel scanning mode. In the preprogrammed mode, the pager receiver is first programmed with frequency data which identifies channels or frequencies in which paging signals are receivable. To program the pager receiver for operating in the all channel scanning mode, the receiver 11 is controlled to rapidly scan all 100 FM channels or frequencies which define pager receiving bands for the pager system, and select and identify those channels for which the signals have adequate signal quality and include system code. Frequency data identifying these "selected" or "predetermined" channels is generated and stored by the tuning data circuit 12 in a manner to be described. After the pager receiver is programmed, only those channels so identified are then scanned by the pager receiver when it is operating. By way of example, the tuning data circuit of the pager receiver may store frequency data for up to eight different channels.

To program the pager receiver for operating in the preprogrammed mode, programming data identifying channels or frequencies for "selected" or "predetermined" channels over which messages will be received, is inputted to the control circuit 13 from an external source and stored by the tuning data circuit 12 for subsequent use in presetting the receiver 11 to those channels or frequencies. In the preprogrammed mode, the receiver 11 scans only the channels to which it is preprogrammed. Because of the preselection of channels or frequencies when the pager receiver 10 operates in the preprogrammed mode, no system codes are required. Thus, the pager receiver is compatible with tone and voice paging arrangements currently in use.

Considering the pager receiver 10 in more detail, the receiver 11 includes a conventional radio frequency (RF) detecting stage 15, a local oscillator 16, a decoder 17, a subcarrier authorization signal (SCA) select circuit 18 and a signal quality detecting circuit 19.

The RF detecting stage 15 and the local oscillator 16 under the control of the tuning data circuit 12 establish the tuning for the pager receiver to the selected channel or frequency. The receiver RF detecting stage 15 and the local oscillator form a superheterodyne receiver which is tuned in correspondence with the frequency being generated by its local oscillator 16. The local oscillator 16 in turn has its frequency determined by the frequency data produced by the tuning data circuit 12.

Typically, SCA pager receivers operate in the existing FM frequency band which extends from 88 MHz to 107.9 MHz using subcarrier authorization to define subchannels of the FM channels. The frequency band is divided into one hundred channels 1 to 100, each having a bandwidth of 200 KHz. Typically, all channel scanning receivers scan each channel in sequence from the first channel no. 1 at the lowest frequency 88 MHz to the last channel no. 100 at the highest frequency 107.9 MHz. The pager receiver provided by the present invention may be used on any conventional paging frequency, but only FM broadcast band, 88.1 MHz-107.9 MHz, subcarrier paging is described. Although reference is made to 100 channels and up to 8 stored channels, all paging channels in all paging bands can be scanned and as many channels as desired can be selected.

In accordance with the subcarrier authorization feature (SCA), each channel is subdivided into first and second subchannels by the use of subcarrier authorization frequencies. The SCA frequencies permit paging functions to be conducted on the standard FM band by using all modulation methods, such as FM, AM, biphase and all others. By way of example, the SCA frequencies used include one frequency 57 KHz designated as the low SCA frequency and a second frequency 92 KHz designated as the high SCA frequency. The SCA select circuit 18 enables the high or low subchannel to be selected for each of the detectable channels for the pager receiver. The decoder 17 decodes the detected signal to determine if system code and/or unit code is present. The signal quality detecting circuit 19 provides an output whenever the signal quality of a signal detected in the frequency band or channel to which the pager receiver is tuned exceeds a preselected signal to noise ratio.

The tuning data circuit 12 includes a data generator 20, an addressable data memory 21, a tuning signal generator 22, a memory address counter 23, a scan register 24, and a missed search register 25. The data generator 20 generates digital frequency data words representing binary coded frequency values which are used in controlling the tuning of the pager receiver to a desired channel or frequency. The scan register 24 maintains a count of the number of channels that the pager receiver 10 is programmed to scan. The missed search register 25 maintains a count indicating the number of times that the pager receiver fails to detect signals on a channel for which the pager receiver is tuned.

The control circuit 13 includes a programmer/controller 26, a cycle timing circuit 27 and an external programmer 28. The programmer/controller 26 includes a microprocessor operating under program control to control the operation of the circuits of the pager receiver. The cycle timing circuit of the pager receiver 10 provides a battery saving function, defining active or processing times and inactive times for the pager receiver 10 to minimize power consumption as will be shown. The external programmer 28 provides programming data to the programmer/controller for establishing the tuning frequencies when the pager receiver operates in the preprogrammed mode.

In programming the pager receiver for operation in the preprogrammed mode, data indicating the channels for which the pager receiver is to be programmed, i.e. selected channels, is applied by the external programmer 28 to the programmer/controller. The programmer/controller 26 controls the data generator 20 to generate frequency data for each channel to be programmed. The frequency data is stored in the frequency data memory 21 under the control of the programmer/controller. The frequency data for each different selected frequency or channel is stored at a different location in the data memory 21. The memory locations are addressable by the address counter 23 to permit read out selectively of the frequency data stored therein. The frequency data read out of the data memory 21 is applied to the tuning signal generator 22 which generates an analog signal for controlling the local oscillator 16 to tune the pager receiver to the frequency represented by the frequency data read out of the data memory.

The programmer/controller 26 generates write and read commands for the data memory 21 and controls the address counter 23 in storing the frequency data for each selected or predetermined channel as the frequency data is generated and in reading out the frequency data from the data memory 21. When frequency data is being stored in the data memory 21 during programming, the programmer/controller 26 increments the scan register 24 such that its state indicates the number of priority channels for which frequency data is stored in the data memory 21. After frequency data for all of the preprogrammed channels has been stored in the data memory 21, the pager receiver transfers to battery saving operation mode. In the battery saving operation mode, the cycle timing circuit 27 periodically energizes pager receiver during a short active or processing period (example 5 ms) and then deenergizes the pager receiver for a substantially longer inactive period (example 1.75 seconds). During each processing period, the pager receiver scans in sequence the channels for which it is preprogrammed until a pager signal is detected. If no signal is detected on any of the preprogrammed channels during a given active period, the inactive period is initiated. If a paging signal is detected, the signal is decoded and the message stored, or generated by the signalling circuit 14, and then the inactive period is initiated.

For programming the pager receiver for operation in the all channel scanning mode, when the pager receiver 10 is energized, the pager receiver rapidly scans all 100 channels and stores in a memory information identifying all of the channels or frequencies where system code is detected and signal quality is at an acceptable level.

More specifically, the control circuit 13 enables the data generator 20 to generate, in sequence, frequency data identifying each channel. As each set of frequency data is generated, the frequency data is applied to the tuning signal generator 22 to cause the pager receiver to be tuned to the corresponding channel. The programmer/controller monitors the output of the signal quality detector 19 and of the decoder 17. If a signal of acceptable quality and including system code is present for the channel to which the pager receiver is tuned, the programmer/controller responsively causes the frequency data being generated to be stored in the data memory circuit 21. If the detected signal is of unacceptable quality or lacks system code, the signal is ignored and frequency data for the next sequential channel is generated. When a detected signal is acceptable, and its frequency data has been stored, the control circuit 13 causes the data generator 20 to generate frequency data representing the next sequential frequency or channel and causes the address counter 23 to index the data memory 21 to the next available location. The process is repeated until the data memory 21 is full or until all of the 100 pager channels have been scanned.

The stored frequency data identifies the channels or frequencies for which the pager is tuned, and these are the channels that the pager receiver 10 will scan during its operating modes.

After all of the 100 channels have been scanned, the pager receiver transfers to battery saving operation mode. In this mode, the cycle timing circuit 27 periodically energizes the pager receiver circuits for operation in a scanning mode. When energized, the pager receiver is tuned to the first channel or frequency whenever the battery saver on mode is enabled and remains tuned to that channel if the signal level is above the scan threshold and if system code or paging code is present. If not, the pager receiver reverts to battery saver off mode. If pager code is present, the pager receiver reverts to battery saver off mode after detecting that the pager code is improper or after decoding of the incoming signal.

Whenever the pager receiver is operating in the all channel scan mode and power is applied, the programmer/controller 26 controls the address counter 23 and the data memory 21 to read out the last used frequency data, referred to as the priority channel data, because this is the frequency data required to tune to a signal channel which is most likely to have a signal present thereon. The priority channel is the last channel scanned. The frequency data read out of the data memory 21 is applied to the tuning signal generator 22. The tuning signal generator 22 in turn controls the local oscillator 16 to tune the pager receiver to the channel represented by the frequency data read out of the data memory 21.

Considering the operating sequences for the scanning mode operation if the first selected signal is not above scan threshold, the pager receiver scans to the next channel for which frequency data is stored. If adequate signal is present, then that channel becomes the first priority channel. If adequate signal is not present on the second channel, the pager receiver scans to the next stored channel, etc. If after scanning all stored channels, an acceptable signal is not detected, the pager receiver reverts to battery saver off mode and scans back to the first priority channel.

When operating in the scanning mode, the receiver 11 is controlled to scan a sequentially higher channel immediately before switching to battery saver off mode. This sequentially higher channel number is compared with the stored frequency data the channels for which the pager receiver is programmed, and if it is the same, the data is ignored. If not, this frequency data is stored in the memory, if there is an available storage location.

Thus, if a signal fails to be detected on the channel to which the pager receiver is tuned, the programmer/controller 26 causes the next channel to be selected. The programmer/controller 26 causes the pager circuits to scan through the channels for which frequency data information is stored in the data memory. Whenever a signal fails to be detected in a data channel for which frequency data is stored in the data memory 21, an indication of the missed search condition is stored in the missed search register 25 in a data storage location assigned to that channel.

In accordance with a scan/skip feature, if an acceptable signal fails to be detected a given number of times, that channel is rendered inactive by setting a channel active/inactive memory bit to inactive, and in subsequent channel scans, that frequency data is ignored. If all of the selected channels are made inactive, the active/inactive status can be ignored for all of the selected channels for which frequency data is stored and the stored frequencies can be scanned at every pager receiver operating cycle because they are the frequencies most likely to become strong again. When operating in the scanning mode, the pager receiver also checks an additional channel or frequency each operating cycle to search for a new strong transmitter signal incoming to the pager receiver.

Pager Receiver With Phase Locked Looped Frequency Synthesizer

Figure 2:
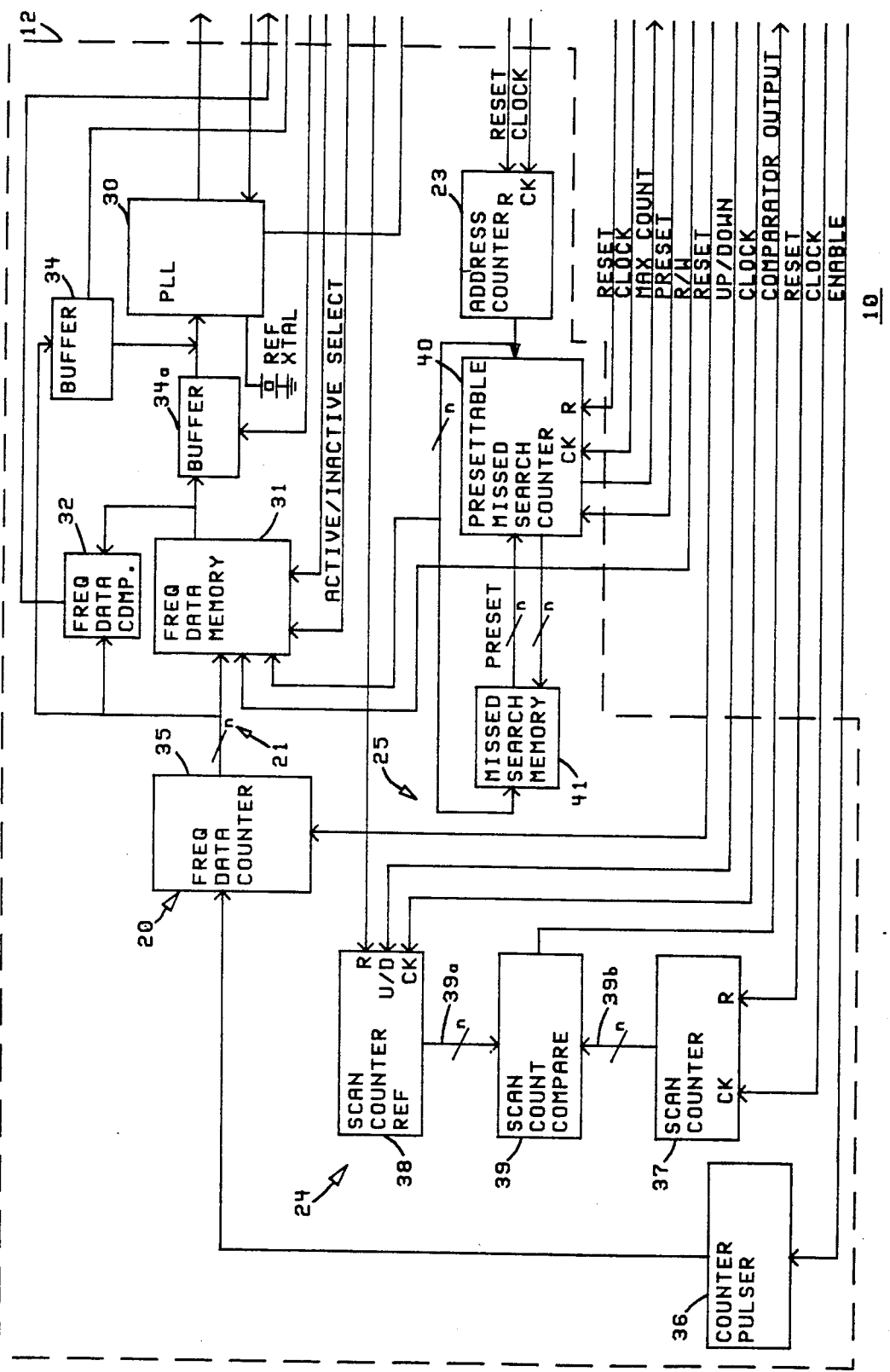

Referring to FIGS. 2 and 2A, the receiver 11 includes a frequency generating superheterodyne receiver having a local oscillator 16 in the form of a voltage controlled oscillator, the frequency of which is controlled by the tuning signal generator 12 which includes a phase locked loop 30. The RF detecting stage 15 is a conventional circuit and includes in series, a varactor diode tuned antenna matching circuit, an isolation amplifier, a band pass filter, a summing circuit, an intermediate frequency filter and a first detector stage, the output of which is connected to the input of the SCA detector 18.

The frequency data read out of the data memory 21 is stored in a programmable counter (not shown) of the phase locked loop 30. The local oscillator frequency is continuously compared to the reference frequency by a phase-discriminator (not shown) of the phase locked loop, the local oscillator frequency being shifted in the direction needed to make it equal to the reference frequency. Thus, for each set of frequency data read out of the data memory 21, the phase locked loop 30 controls the local oscillator 16 to cause the pager receiver to be tuned to the channel or frequency corresponding to the frequency data that has been read out of the data memory. Likewise, upon read out from the memory of another set of frequency data, the phase locked loop 30 will adjust the local oscillator frequency to retune the pager receiver to the channel or frequency represented by the new frequency data.

The frequency data generated for each channel or frequency comprises an eight-bit frequency data word. Two additional bits are provided, one bit indicating whether the high SCA frequency or low SCA frequency is to be received and, the other bit, referred to as the channel active/inactive bit, indicating whether the channel is active or inactive. The channel active/inactive bits and the SCA select bit may be stored in either the frequency data memory, 31, as shown in FIG. 2, or in the missed search memory 41 for the embodiment shown in FIGS. 8 and 9, as both memories contain data for the same address. In the exemplary embodiment, the pager receiver 10 is assumed to store frequency data for up to eight channels or frequencies.

The addressable data memory 21 includes a nine-bit memory 31 having addressable data storage locations for at least eight, nine bit data words. However, a larger or smaller memory can be provided if more or less than eight predetermined channels are desired for a pager receiver. The data memory 21 further includes an eight bit frequency data comparator circuit 32, and associated tristate buffers 34 and 34a. The address counter 23 comprises an eight bit counter.

Figure 8:
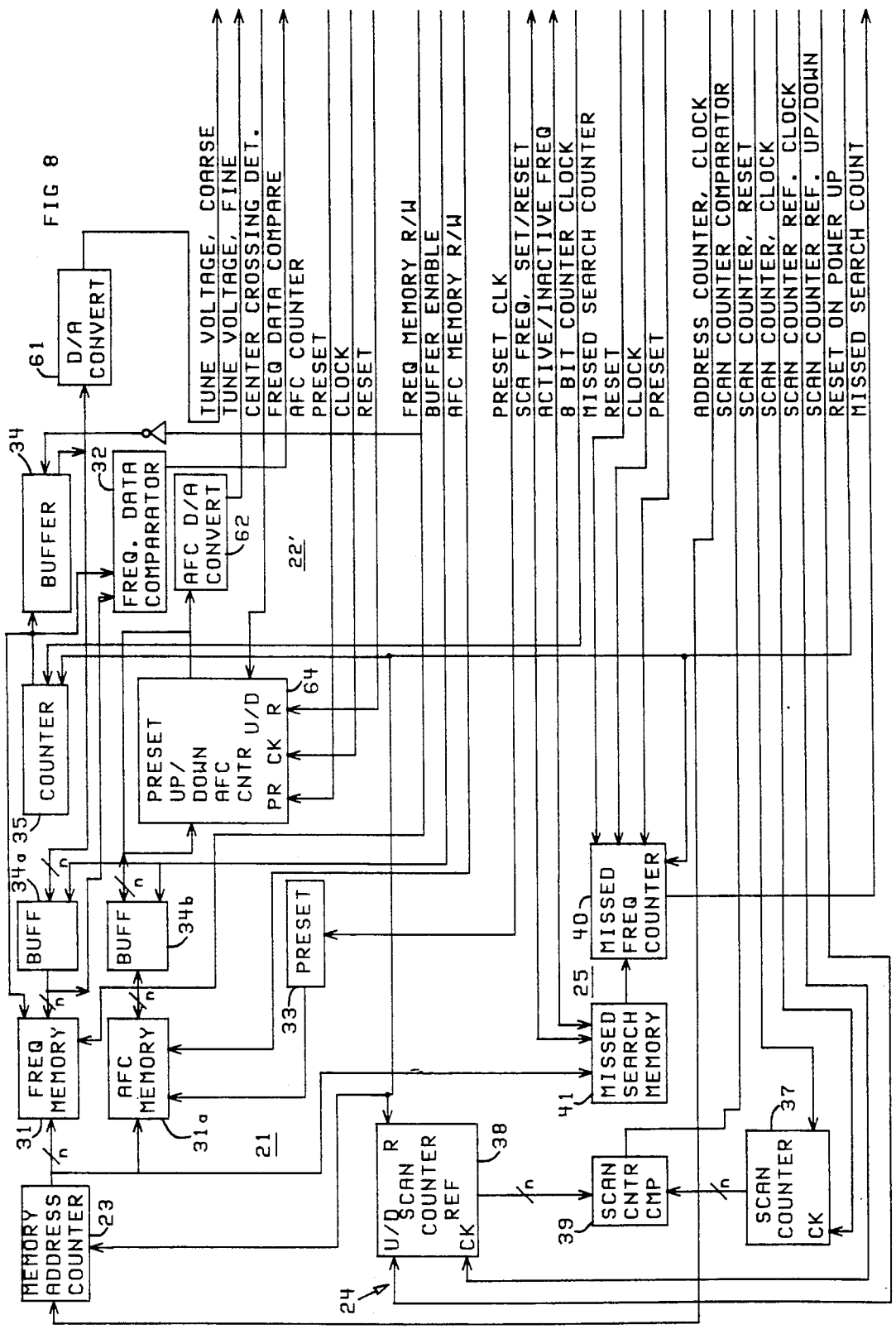
FIGS. 8 and 9, when arranged as shown in FIG. 9A, are a block diagram for a paging receiver provided in accordance with a second embodiment of the invention and including a tuning circuit having an analog voltage generator.
Figure 9:
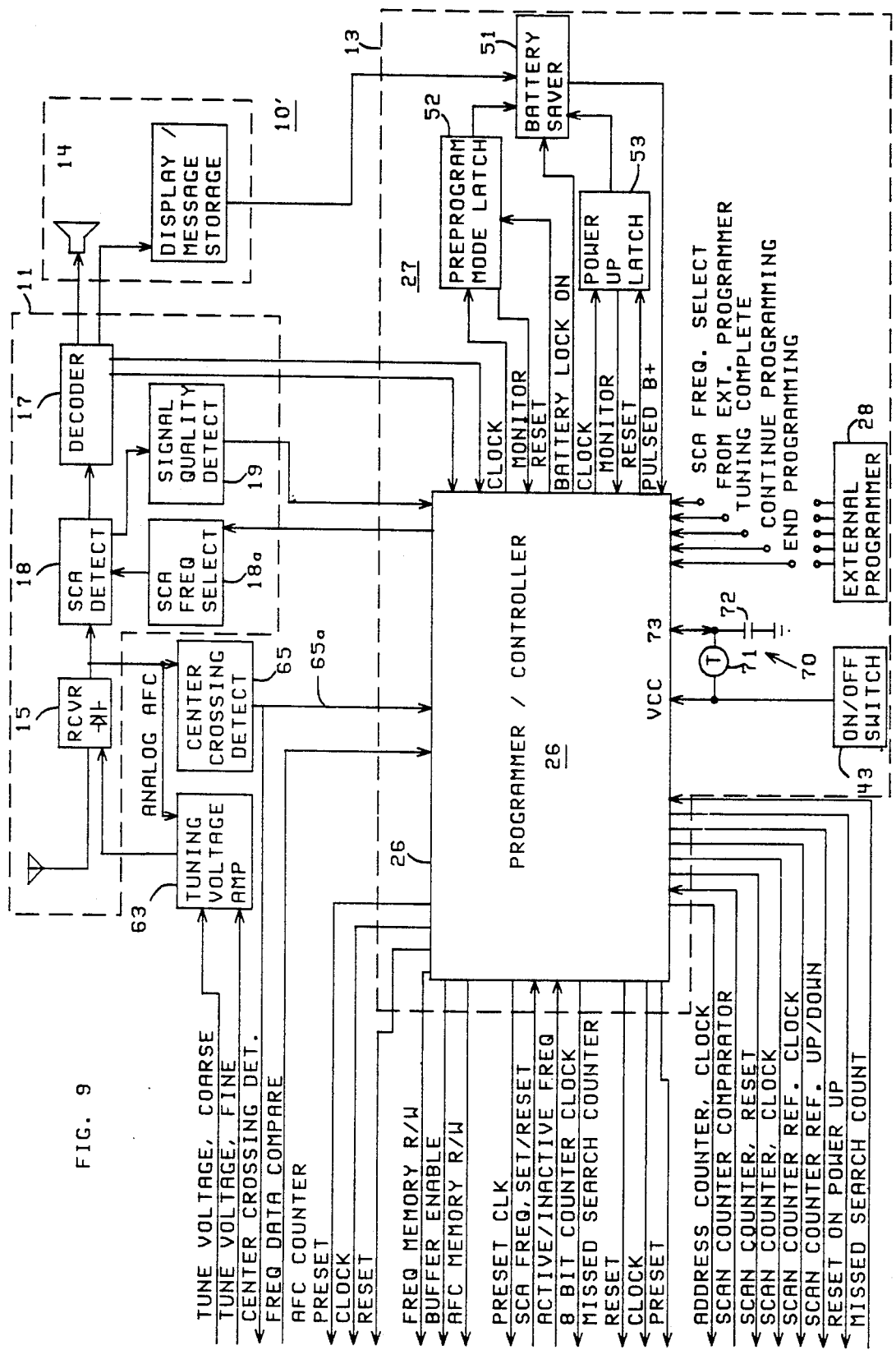

The data generating circuit 20 includes an eight bit frequency data counter 35 and a counter pulse generator 36 which can be external to the programmer/controller as shown in FIG. 2 or part of the programmer/controller for the embodiment shown in FIGS. 8 and 9. The scan register 24 includes a scan counter 37, a scan counter reference 38 and a scan count comparator circuit 39.

The missed search register 25 includes a presettable missed search counter 40 and an addressable missed search memory 41 which has addressable data storage locations for at least eight data words. Each data word indicates the number of times that a signal failed to be detected in a frequency and/or channel for which frequency data is stored in memory 31.

Referring to FIG. 2A, the programmer/controller 26 comprises a programmer/controller, such as the type M50742 commercially available from Mitsubishi, and which includes a microprocessor and suitable memory for storing the program codes for executing the various routines which define the operating sequences for the pager receiver. The programmer/controller includes further memory for storing logic signals received from circuits of the pager receiver and data and command information signals received from the external programmer for use in executing the programming operations. The programmer/controller 26 includes a plurality of input/output ports by which control signals are extended to the circuits of the pager receiver and over which status signals are received from the pager receiver circuits. The microprocessor operates under program control to carry out the operations of the pager receiver in executing its various operating modes as will be described.

The programmer/controller 26 has a first input SW connected to on/off switch 43 which activates the pager receiver 10. The programmer/controller 26 receives inputs from the external programmer 28 over five inputs, namely PREPROGRAM FREQUENCY DATA; PREPROGRAM/SCANNER SELECT; END PROGRAMMING; CONTINUE PROGRAMMING; and SCA FREQ. SELECT. The programmer/controller 26 provides a control output to the external programmer 28 over an output TUNING COMPLETE.

By way of example, the external programmer 28 may provide a light output arrangement for supplying commands and data to the pager receiver. This may be accomplished using light emitting diodes and detectors in the external programmer 28 and the I/O port of the controller 26 to which the external programmer is coupled. The pager receiver can be factory programmed or programmed by the user/owner.

The cycle timing circuit 27 includes a battery saver circuit 51, a preprogram mode latch 52 and a power up latch 53.

The programmer/controller enables the battery saver on mode by enabling the battery saver circuit 51 over an output LOCK ON and generates a pulsed direct current signal pulsed B+ which applies power to the pager circuits. The battery saver circuit 51 has further enabling inputs connected to outputs of the preprogram mode latch 52 and the power up latch 53 which are controlled by the programmer/controller 26 over enable outputs CK, reset outputs RESET and status inputs MON. The battery saver circuit 51 also has an enabling input connected to an output of the decoder 17 through the programmer/controller 26 which maintains the battery saver on mode enabled whenever a system or unit code is detected.

The battery saver circuit 51 includes a battery saver on timer and a battery saver off timer. The battery saver on timer when enabled generates a timing pulse 5 milliseconds in duration, for example, defining an active or processing period for the pager receiver. The battery saver off timer when enabled generates a timing pulse of 1.75 seconds duration, for example, defining an inactive period for the pager receiver. When the battery saver on timer times out, it enables the battery saver off timer and conversely, when the battery saver off timer times out, it enables the battery saver on timer. The battery saver on timer can be latched on by the output LOCK ON, by the preprogram latch 52, or the power up latch 53, all of which are controlled by the programmer/controller, or by the output of the signaling circuit 14, for extending the active or processing period, defined by the battery saver on timer, whenever signal processing is required.

With reference to FIGS. 2 and 2A, the programmer/controller 26 controls the counter pulser 36 over an output ENABLE which when logic high enables the counter pulser 36 to generate pulses for application to the frequency data counter 35. The programmer/controller 26 provides clock pulses over output CLOCK to the scan counter 37 for stepping the counter to register a count indicative of the number of frequencies or channels that are scanned. The programmer/controller 26 provides a reset signal over output RESET to the scan counter 37 at the start of each program operation. Similarly, the programmer/controller 26 increments scan counter reference 38 by applying pulses over output CLOCK and resets the scan counter reference 38 with a reset pulse applied over output RESET. The programmer/controller 26 also has a control output UP/DOWN connected to the up/down input of the scan counter reference 38 to apply a signal to the scan counter reference 38 for adjusting its count up or down as a function of the number of active frequencies stored in the data memory. The scan count comparator circuit 39 has first and second n-bit data inputs 39a and 39b connected over respective n-bit data busses to the data outputs of scan counter reference 38 and scan counter 37, respectively. The scan count comparator circuit 39 compares the count registered by the scan counter 37 with that stored in the scan counter reference 38 and provides an output to an input COMP of the programmer/controller 26 whenever the counts are identical.

The address counter 23 has clock input and a reset input connected to outputs CLOCK and RESET, respectively, of the programmer/controller. The address counter 23 has its data outputs connected over an n-bit data bus to be address inputs of the data memory, inputs of the missed search memory and missed search counter.

The programmer/controller 26 controls the data memory 31 over output R/W to set the data memory in the read or write mode as required. The data memory 31 has parallel data inputs connected by way of an n-bit data bus to parallel data outputs of the frequency data counter 35 and to data inputs of the frequency data comparator circuit 32 which has second data inputs connected by way of an n-bit data bus to data outputs of the frequency data memory 31. This enables the frequency data comparator circuit 32 to compare frequency data words provided by the frequency data counter with frequency data words read out of the data memory 31. When the two data words are identical, the frequency data comparator provides a control output to an input COMPARE of the programmer/controller 26.

The presettable missed search counter 40 has a clock input, a preset command input and a reset input connected to respective outputs CLOCK, PRESET and RESET of the programmer/controller 26 and an output connected to an input MAX COUNT of the programmer/controller. The missed search counter has preset inputs connected to data outputs of the missed search memory 41 over an n-bit data bus and data outputs connected via an n-bit data bus to data inputs of the missed search memory 41.

The missed search memory 41 has addressable data storage locations each storing a data word for each priority channel or frequency representing the count of the number of times that signal of acceptable quality and with system code fails to be detected when the pager receiver is tuned to that channel. Each time the data memory is addressed for a given channel, the location in the missed search memory storing the missed search count for that channel is also addressed and the count data is applied to the preset inputs of the missed search counter 40. This data is loaded into the counter when the programmer/controller 26 enables its output PRESET. The count registered in the missed search counter 40, be it that read out of the missed search memory 41 or such data incremented to reflect a further failure to detect an acceptable signal on the associated channel, is stored in the memory 41 before the next channel frequency data locations are addressed.

The parallel data outputs of the frequency data counter 35 are connected through inputs of a tristate buffer 34 which has parallel data outputs connected to parallel data inputs of the phase locked loop 30. The parallel data outputs of the data memory 31 are connected to parallel data inputs of tristate buffer 34a which has parallel data outputs connected to parallel data inputs of the phase locked loop. The state of the tristate buffer circuits 34 and 34a is controlled by the programmer/controller 26 over its outputs enable for selecting the data memory 31 or the frequency data counter 35 as a source of frequency data for the phase locked loop.

The data memory 31 has a further bidirectional data input connected to an input/output SCA BIT output of the programmer/controller 26 to permit the SCA bits to be stored in the memory 31 with their associated frequency data. The SCA BIT when read out of memory 31 over conductor SCA FREQ. SELECT is applied through SCA frequency select circuit 18a to the SCA detector circuit 18.

The programmer/controller 26 has an input SIGNAL QUALITY DETECT connected to an output of the signal quality detecting circuit 19 and inputs UNIT DECODE and SYSTEM DECODE DETECT, connected to outputs of the decoder 17.

Figure 3:
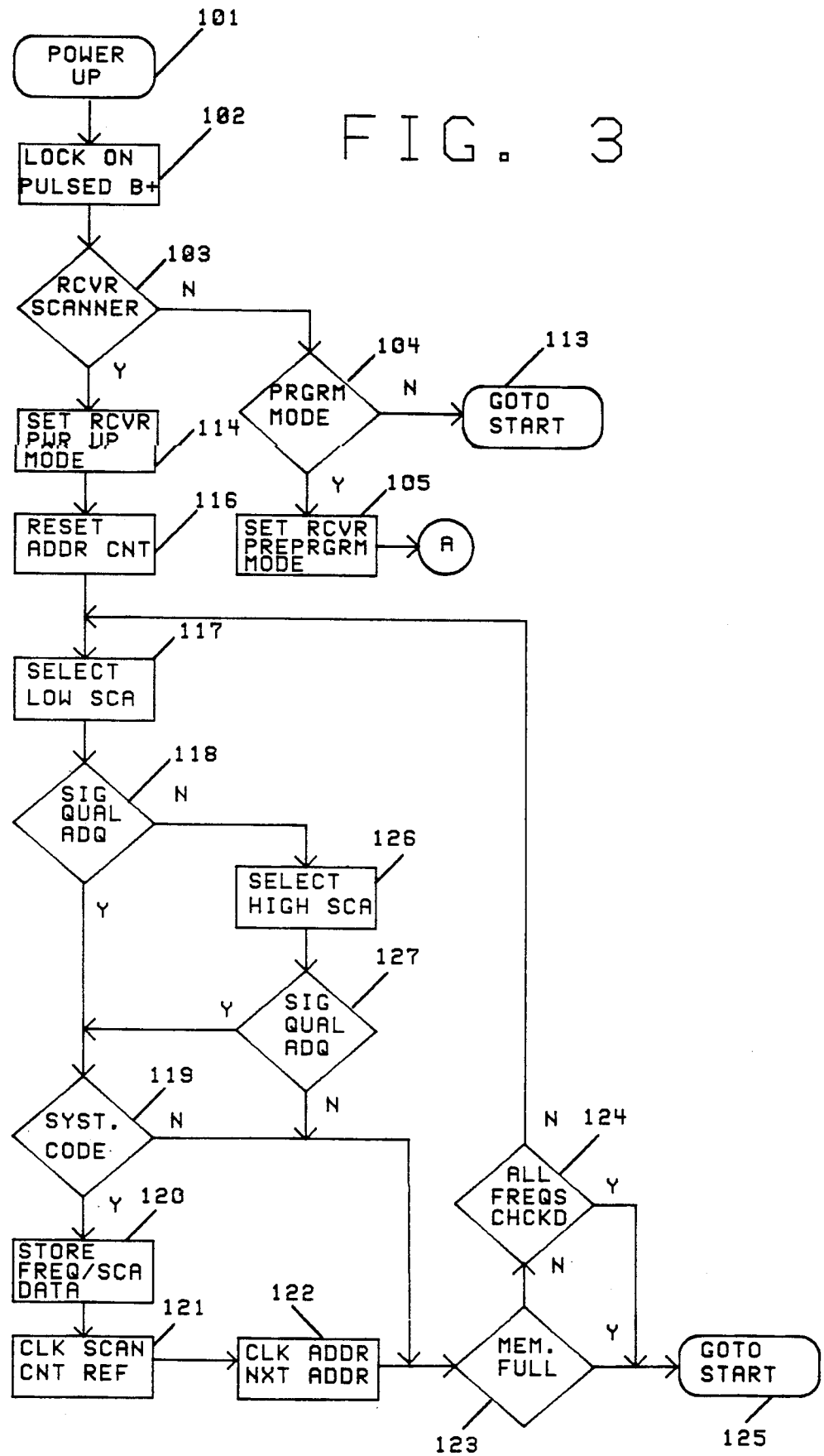
FIG. 3 is a flow chart illustrating programming the pager receiver for operation in a scanning mode.
Figure 4:
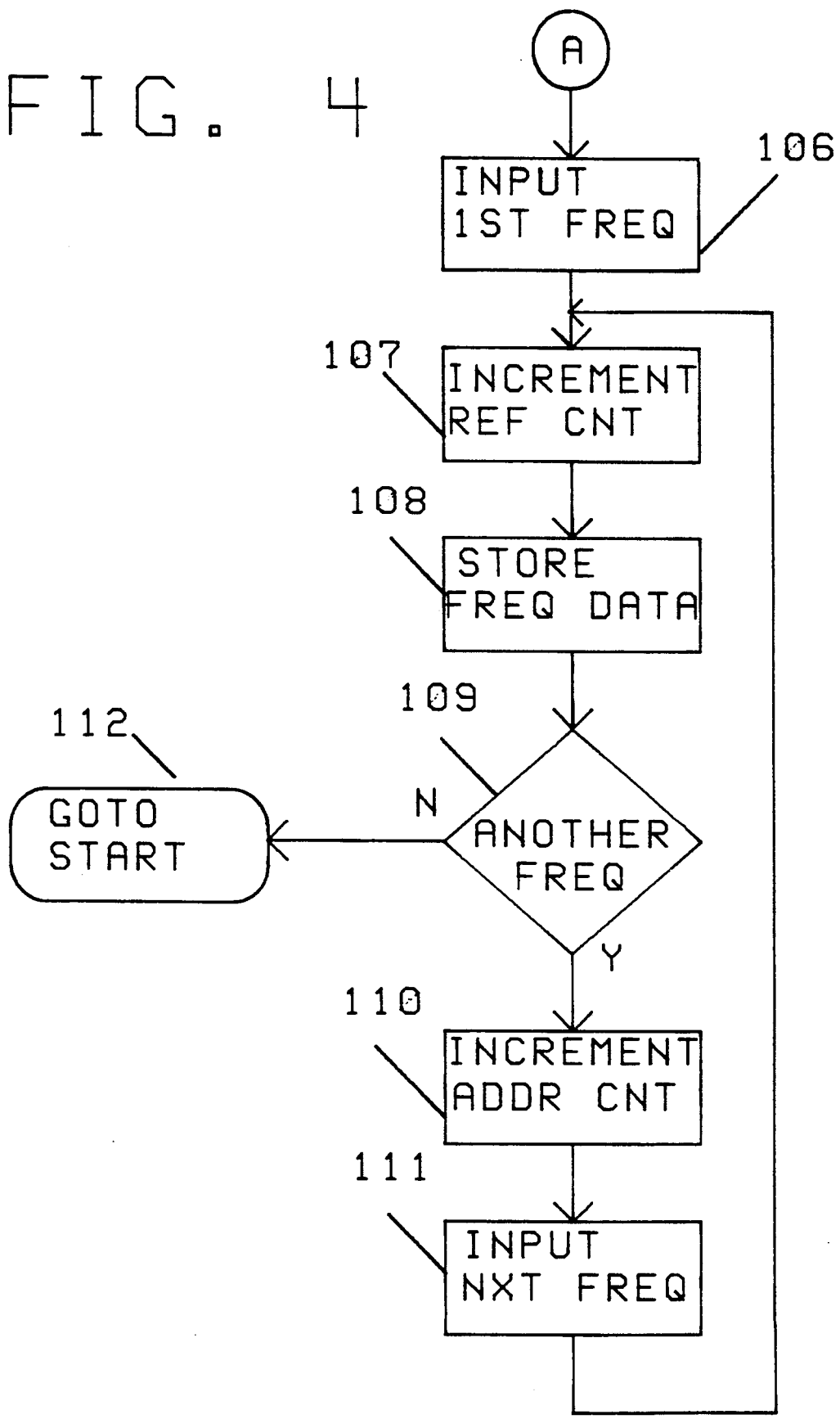
FIG. 4 is a flow chart illustrating programming the pager receiver for operation in a preprogrammed mode.

Preprogrammed Pager Programming (FIGS. 3-4)

Referring to the block diagram of FIGS. 2 and 2A and the flow charts of FIGS. 3-4, the manner in which the pager receiver 10 is programmed for operation in the preprogrammed mode will be described. Before entering the operating mode, the external programmer 28 is preprogrammed for each transmitter frequency and SCA frequency to be received.

To enter the programming mode, block 104, the on/-off switch 43 is depressed, block 101, for approximately eight seconds which causes the programmer/controller 26 to set the preprogram mode latch 52 active. When the preprogram mode latch 52 is set, its output enables the battery saver circuit 51 to latch pulsed B+ on during programming operation, block 102. The programmer/controller 26 sets the address counter 23 to address the first memory location in data memory 31 and search memory 41.

The programmer/controller 26 receives the data for the first frequency to be programmed on input PRE-PROGRAM FREQUENCY DATA and an SCA select bit on input SCA FREQ SELECT via the external programmer data input lines, block 106. Next, the programmer/controller enables the counter pulser 36 via output ENABLE proportionately to the data received from the external programmer. The counter pulser output increments the frequency data counter 35 so that the frequency data counter 35 registers a count representing the frequency data for the channel to be preprogrammed. The frequency data counter 35 outputs the frequency data on its output data buss to the parallel data inputs of the frequency data memory 31. The programmer/controller extends the SCA bit to the data memory 31 on output SCA BIT. Then, the programmer/controller 26 increments the scan counter reference 38, block 107, each time a new frequency is programmed.

The programmer/controller 26 generates a write command on output R/W to store the frequency data and the SCA select bit in the first memory location, block 108. The frequency data will be used to program the phase locked loop 30 with the first frequency for controlling the local oscillator 16 for the superheterodyne receiver 15.

After the programmer/controller 26 stores the frequency data, it outputs a tuning complete signal to the external programmer on output TUNING COMPLETE and a determination is made as whether or not there is another frequency to be programmed, block 109. If the maximum number of frequencies are stored or no other frequencies are to be programmed, the external preprogrammer signals the programmer/controller 26 on input END PROGRAMMING to reset the preprogram mode latch 52 and enter the operate mode, block 112. If there is another frequency to be programmed, the external programmer 28 signals the programmer/controller 26 on input CONTINUE PROGRAMMING and outputs the frequency data and SCA bit status for the next frequency. When the continue programming signal is present, the programmer/controller generates a signal on output CLOCK which clocks the address counter 23 to change the frequency data memory address, and missed search memory address, to the next location, block 110, and the programmer/controller receives the data for the next frequency, block 111, and loops back to block 107 to repeat the process. The programmer/controller 26 then generates a write signal on output R/W which causes the frequency data and the SCA select bit to be stored in the data memory 31 as previously described. The process continues until all channel frequency data is stored and the external programmer 28 signals the programmer/controller on input END PROGRAMMING.

Figure 5:
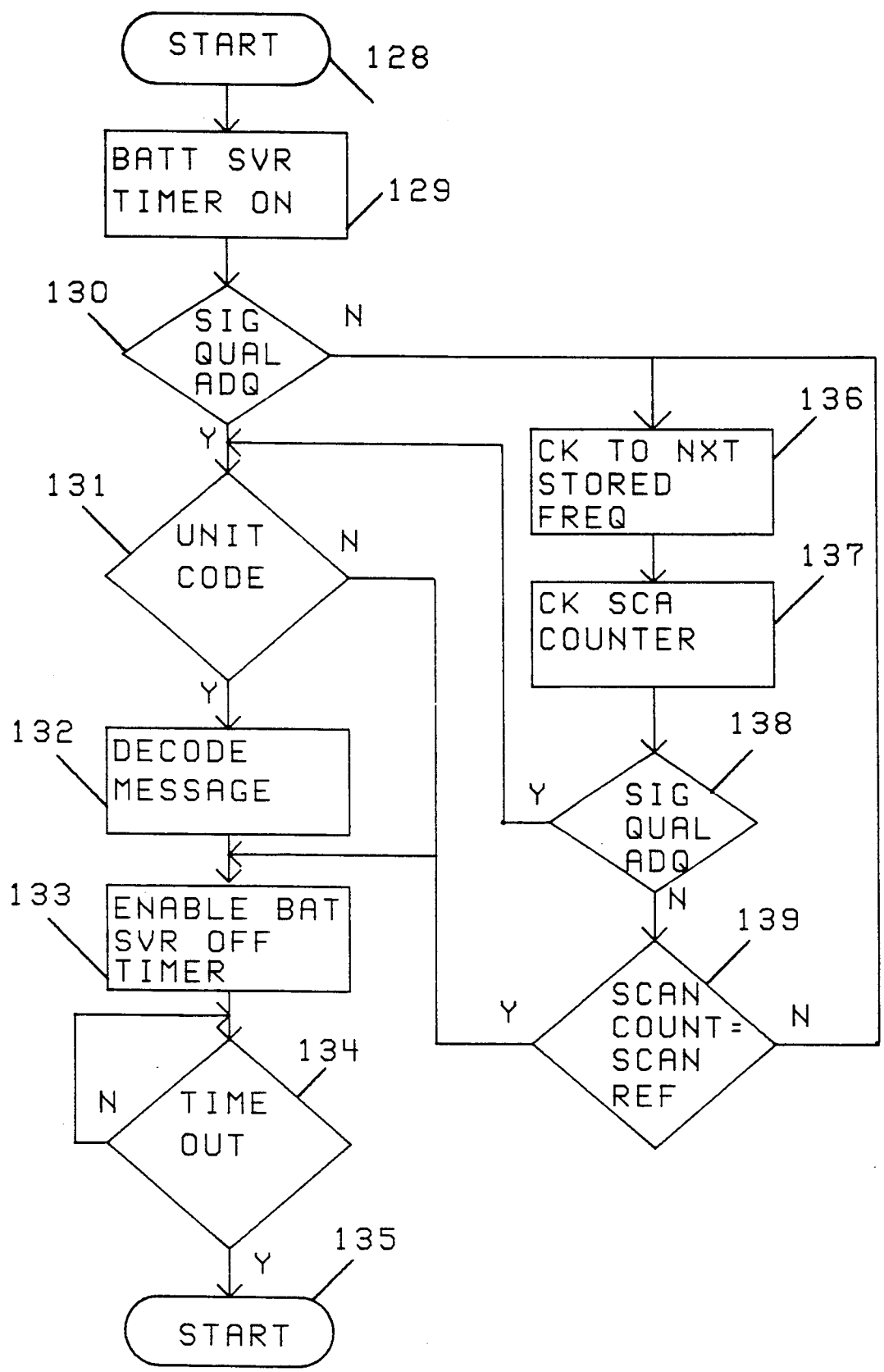
FIG. 5 is a flow chart illustrating the operation of the pager receiver in a preprogrammed mode.

Preprogrammed Pager Operation Mode (FIG. 5)

Referring to FIGS. 2, 2A and 5, after programming is completed, the battery saver circuit periodically enables pulsed B+ voltage, defining active periods for the pager receiver, each followed by an inactive period. When the battery saver on mode is enabled, block 129, the pulsed B+ voltage is applied to the pager circuits to initiate an operating cycle. The address counter 23 addresses the last used location in the data memory 31 which stores frequency data and SCA bit to select the tuning voltage applied to the voltage controlled oscillator 16. The programmer/controller generates a read signal on output R/W for the memory 31 to read out the frequency data at the addressed location for application to the phase locked loop which provides a control voltage for the local oscillator. The local oscillator responsively generates the proper frequency to tune the receiver 15 to receive the appropriate transmitter frequency. The tuning voltage is also applied to the RF receiver section 15 to tune the receiver for maximum sensitivity. The SCA select bit is applied to the SCA detecting circuit 18 to select the SCA frequency to be received.

If the signal quality detector 19 detects sufficient SCA signal to receive a message, block 130, its output applied to input SIGNAL QUALITY DETECT causes the programmer/controller to reset the battery saver on timer so that its timing signal remains high long enough to maintain pulsed B+ on to enable the decoder 17 to decode the unit code if it is present. If the unit code is present, block 131, the decoder 17 signals the battery saver circuit 51 to maintain the pulsed B+ until the message has been received and stored, block 132. The programmer/controller then disables the battery saver on timer, causing it to terminate the pulsed B+ and enables the battery saver off timer, block 133. When the off timer times out, block 134, another scan cycle is initiated.

If the amplitude of the signal supplied to the input of the signal quality detector 19 is below the level established for minimum signal to detect data, block 130, the programmer/controller clocks the address counter 23 to the next address for the data memory 31 and missed search memory 41, block 136, and then applies a read signal to the data memory 31. This causes stored frequency data and the SCA select bit in the new address to be outputted to the phase locked loop 30, adjusting the voltage controlled oscillator 16 to a new frequency. The SCA bit is applied to the SCA detector 18 to select the SCA frequency to be received. The signal quality detector 19 signals the programmer/controller 26 to reset the battery saver on timer for another full pulsed B+ on time. The programmer/controller clocks the scan counter 37, block 137, to increment the count of the number of frequencies that have been scanned in the current operating cycle.

If after changing to the new frequency the signal quality detector 19 detects a signal of sufficient strength, block 138, the decoder detects the unit code, the decoder 17 provides a signal on input UNIT DE- CODE and the programmer/controller responds as described above.

If after changing to the new frequency the signal quality detector 19 fails to detect sufficient SCA signal to decode data, the signal quality detector 19 outputs a signal on input SIGNAL QUALITY DETECT causing the programmer/controller to change frequency as previously described.

If the address counter 23 has been clocked the same number of times as the number of frequencies stored as indicated by the scan counter and scan count reference, respectively, block 139, their counts will be the same so that the scan count comparator 39 provides an output signal on input COMPARATOR OUTPUT. This output signal causes the programmer/controller to reset the battery saver circuit 51 which returns the pager receiver circuits to the battery saver off mode, block 133.

Scanning Pager Programming (FIG. 3)

Referring to FIGS. 2, 2A and 3, as indicated, the pager receiver 10 just described operating in a preprogrammed mode can also operate in an all channel scanning mode. However, in programming the pager receiver for scanning mode operation, all channels are rapidly scanned for signal and system code presence and the frequency data for channels on which acceptable signals are detected is stored as selected or predetermined channel data. Only the selected channels are scanned in the operating mode.

When the on/off switch 43 is depressed and the receiver pager is not put into the preprogram mode, block 103, the programmer/controller 26 sets the power up latch 53, block 114. The power up latch 53 signals the battery saver circuit 51 to lock on the pulsed B+ during power up programming for the all channel scan mode.

The programmer/controller 26, resets the address counter 23, block 116, enables the counter pulser 36 and selects the low SCA frequency, block 117. The counter pulser 36 resets the frequency data counter 20 which supplies to the frequency data memory 31 frequency data starting with the lowest possible receive frequency. The frequency data memory 31 supplies the frequency data to the phase locked loop 30 which changes the tuning voltage applied to the VCO 16 causing the local oscillator to generate the proper frequency to receive the appropriate paging frequency. The tuning voltage is also applied to the RF section 15 to tune the receiver for maximum sensitivity.

The programmer/controller 26 monitors the output of the signal quality detector 19 to determine if sufficient quality SCA signal is present to receive a message, block 118. If sufficient signal quality is not present, the high SCA frequency is selected, block 126. If sufficient signal quality is then present, block 127, the programmer/controller 26 monitors the output of the decoder 17 for system code detection, block 119. If system code is present, the programmer/controller 26 stores the frequency data and SCA select bit in memory 31, block 120, clocks the scan reference counter 38, block 121, and clocks the address counter 23, block 122. The number of times that the scan reference counter is clocked during programming indicates the number of selected channels for which the pager receiver is programmed.

Then a test is made to determine if the memory is full, block 123. If the memory is full, the programmer/controller 26 resets the power up latch 53 and enables the battery saver off timer. If the memory is not full or if the system code is not present, the programmer/controller 26 determines if all possible frequencies have been checked, block 124, and if so, the power up latch 53 is reset, enabling the battery saver off timer, thus starting normal operation. If all possible frequencies have not been checked, the programmer/controller 26 enables the counter pulser 36 which clocks the frequency data counter 20 to generate the next sequential frequency to be checked and repeats the above functions. If when the signal quality detector 19 is monitored and acceptable signal is not present for either SCA frequency, or if it is determined to not have sufficient signal quality to receive a message, the programmer/controller 26 determines if all possible frequencies have been checked. If all frequencies have not been checked, the counter pulser 36 is again enabled to clock the frequency data counter 20 to the next frequency to be checked. When all frequencies have been checked, the programmer/controller 26 resets the power up latch 53, turns on the battery saver off timer, and switches the pager receiver to the operate mode. The data memory 31 stores the frequency for all of the channels for which the pager receiver is programmed. The scan count reference indicates the number of selected channels for which the pager receiver is programmed.

Figure 6:
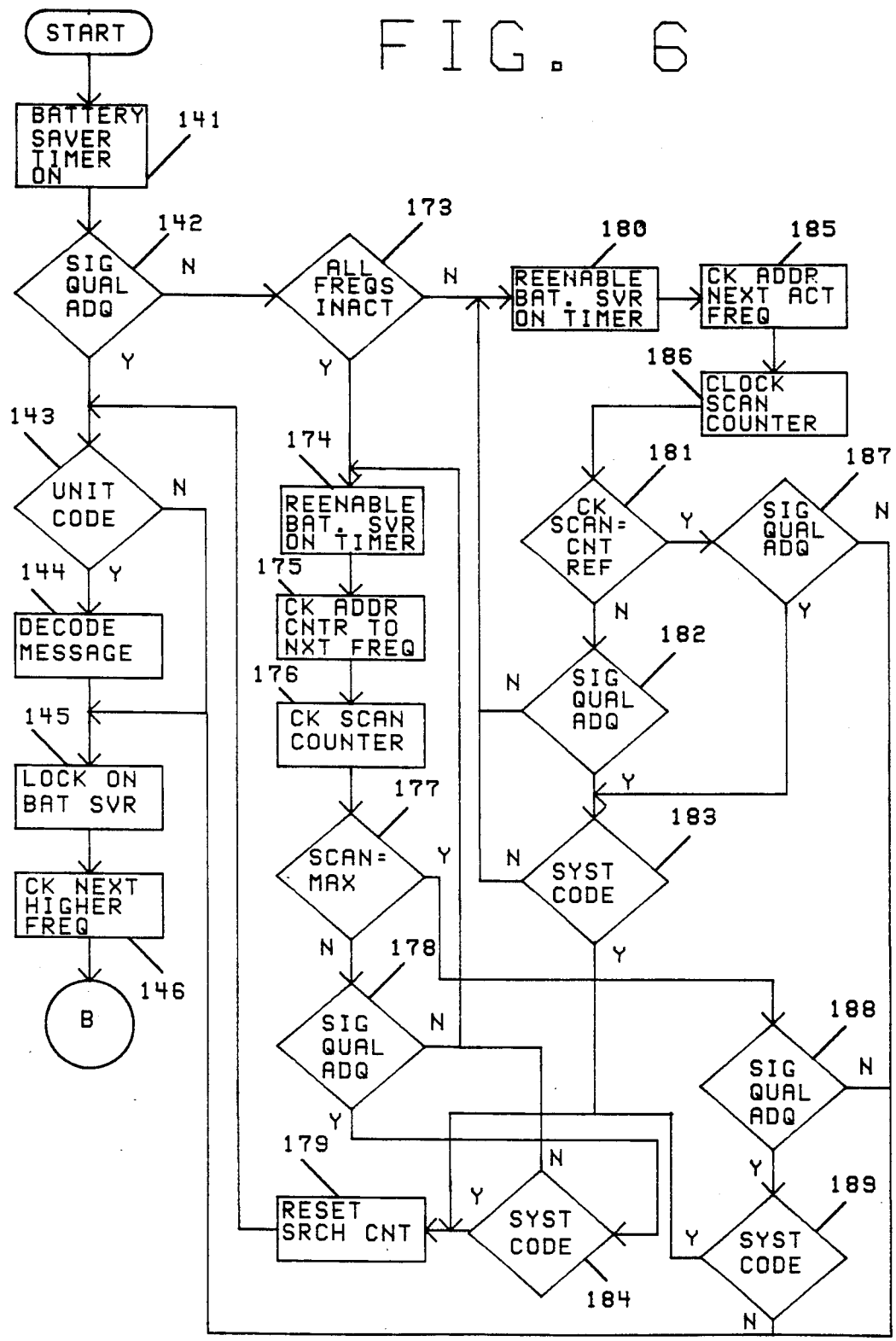
FIGS. 6 and 7 are a flow chart illustrating the operation of the pager receiver in the scanning mode.
Figure 7:
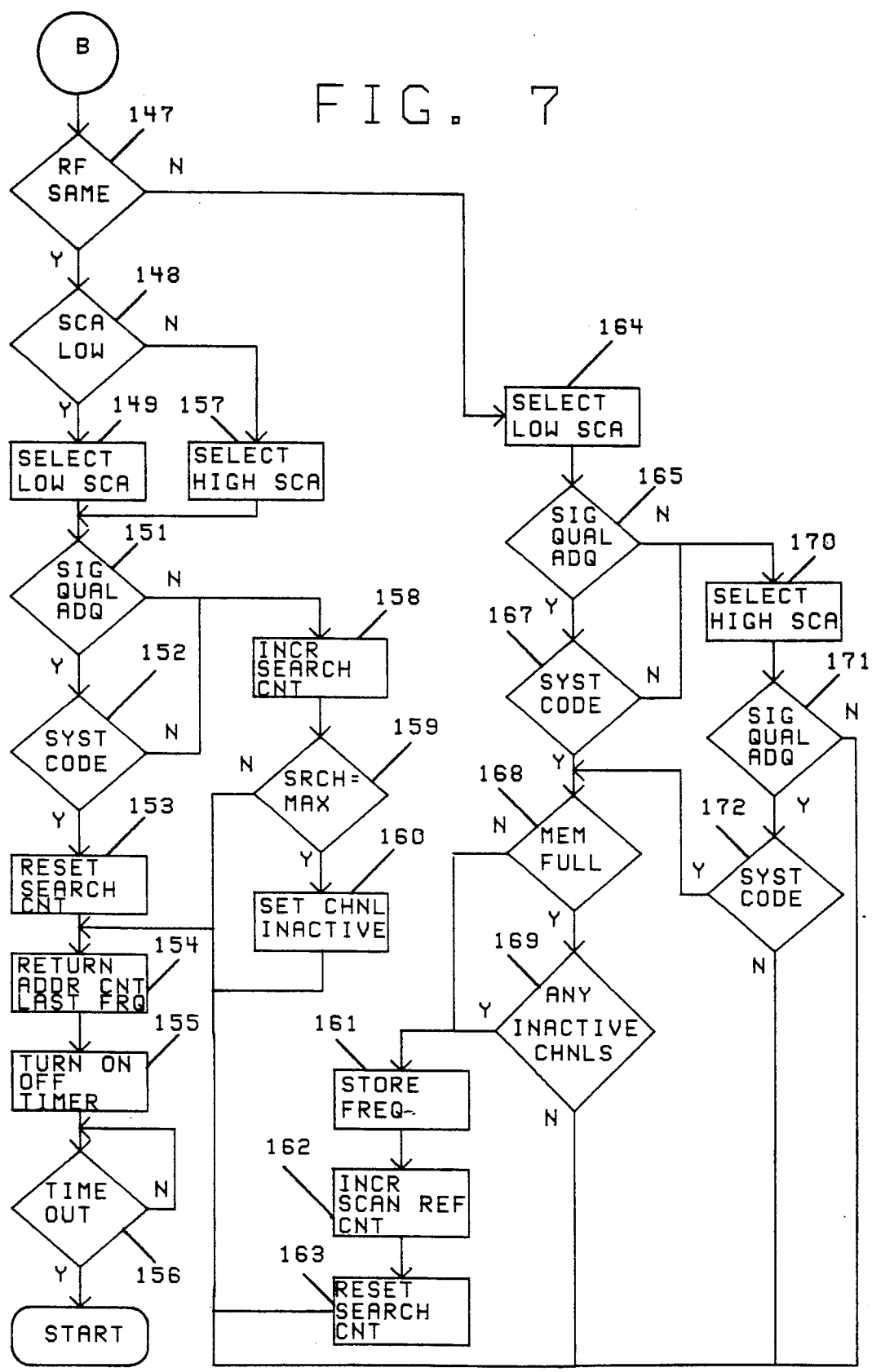

Scanning Pager Operation (FIGS. 6 and 7)

Referring to FIGS. 2, 2A, 6 and 7, after the pager receiver has been programmed for operation in the scanning mode, then the next time that the battery saver on timer is enabled, block 141, initiating a pager receiver active cycle, pulsed B+ is applied to the pager circuits. The address counter 23 addresses the last used memory locations in data memory 31 which stores frequency data and SCA select data, obtained from the scan search operation, and the locations in the missed search memory 41 which store the active/inactive data bit and the missed search count which is applied to the missed search counter preset inputs. The programmer/controller enables output R/W to a read state to read the frequency data out of the data memory 31. The programmer/controller also enables output PRESET to load the missed search counter 40. The frequency data is applied to the phase locked loop 30 which changes the tuning voltage applied to the VCO 16 causing the local oscillator to generate the proper frequency to receive the appropriate transmitter. The tuning voltage is also applied to the RF section 15 to tune the receiver 15 for maximum sensitivity.

The SCA select bit is applied to SCA detector 18 to select the SCA frequency to be received. The active/inactive bit is monitored by the programmer/controller and is used to flag the programmer/controller 26 as to whether the stored frequency is to be used or skipped. If a given frequency is not received in the sequentially higher channel search mode for a predetermined number of times, that frequency is made inactive, but the frequency data is retained in memory. If all frequencies are made inactive, the active/inactive bits are ignored and the stored frequencies are scanned at every battery saver "on" pulse, that is, each time the battery saver on timer is enabled, as they are the most likely frequencies to become strong again.

After the receiver has been tuned to the first frequency, the signal quality detector 19 is monitored by the programmer/controller 26 to determine if adequate signal quality is present to receive a message, block 142. If signal quality is adequate, the decoder 17 checks for unit code, block 143, and if the proper unit code is detected, the message is decoded and stored, block 144.

After the message is stored, the battery saver circuit 51 is held enabled, block 145, and the pager receiver searches for another active frequency, block 146, before reverting to the low power idle mode. The programmer/controller 26 enables the counter pulser 36 to clock the frequency data counter 20 to the next sequentially higher frequency. The frequency data from the frequency data counter 20 is then compared with the frequency data stored in the frequency data memory 31. If the frequency data is the same as any stored frequency data, block 147, the frequency data comparator 32 signals the programmer/controller 26. The programmer/controller then reads the SCA select bit, block 148, which is stored as part of the frequency data and sets the receiver to receive the same SCA frequency, blocks 149,157.

The programmer/controller 26 then monitors the output of the signal quality detector 19, block 151, and if the signal is of adequate quality, and system code is present, block 152, the programmer/controller 26 resets and stores the count of the missed search counter 40, block 153, for that frequency, returns the address counter 23 to the last used frequency, block 154, and enables the battery saver off timer, block 155. When the off timer times out, block 156, the program loops back to block 141 and initiates a new cycle.

If signal quality is not adequate, block 151, the programmer/controller 26 increments the missed search counter 40, block 158. If the missed search counter 40 count equals that for the maximum of allowable misses, block 159, the frequency active/inactive bit for the frequency is set to inactive and stored with the frequency data, block 160. The programmer/controller 26 then returns the address counter 23 to the last used frequency, block 154, and enables the battery saver off timer, block 155.

If in the above example the missed search counter 40 does not equal the maximum allowable misses, block 159, the missed search count is stored in the missed search memory 41, the address counter 23 is returned to the last used frequency and the battery saver off timer is enabled.

In the above example, if the frequency data is not the same as any frequency already stored, block 147, the programmer/controller 26 selects the low SCA frequency, block 164, and monitors the signal quality detector 19 to determine if adequate signal quality is present to receive a message, block 165. If adequate signal quality is not present, the programmer/controller 26 selects the high SCA frequency, block 170, and again checks for adequate signal quality, block 171. If adequate signal quality is detected on either SCA frequency the programmer/controller 26 monitors the system code detect line from the decoder 17, blocks 167 and 172. If system code is detected, a test is made to determine if the memory 31 is full, block 168. If the memory is not full, the programmer/controller 26 stores the frequency data in that channel, block 161, the SCA select bit, sets the active/inactive bit to active, increments the scan reference counter 38, block 162, resets the missed search counter, block 163, stores the count of the presettable missed search counter 40 in the missed search memory 41, returns address counter 23 to last used frequency, block 154, and enables the battery saver off timer, block 155, operation continues as previously described.

If in the above example the system code is not detected, block 172, the signal quality is not adequate to receive a message, or the memory is full, the programmer/controller returns the address counter 23 to the last used frequency, block 154, and enables the battery saver off timer, block 155.

If when the battery saver on mode is first enabled, the signal quality detector 19 does not detect a signal of adequate quality to receive a message, block 142, the programmer/controller monitors the active/inactive bit and clocks the address counter 23 to the next active frequency. If all frequencies are inactive, block 173, the programmer/controller reenables the battery saver on timer, block 174, clocks the address counter 23 to the next stored frequency ignoring the active/inactive bit, block 175, clocks the scan counter 37, block 176, and tests, block 177, to determine if the receiver has been scanned through all memory addresses. If the scan count is not maximum the programmer/controller then monitors the signal quality detector 19, block 178, to determine if a signal of adequate quality is present. If a signal of adequate quality is not present, and the receiver has not been scanned through all memory addresses, the programmer/controller reenables the battery saver on timer, block 174, and repeats the sequences just described. If the receiver has been scanned through all memory addresses, the programmer/controller again monitors the signal quality detector 19, block 178, to determine if a signal of adequate quality is present and if it is not, the programmer/controller locks on the battery saver 51, block 145, and clocks to the next higher frequency block 146, as previously explained.

If when checking the stored frequencies as described above, the signal quality detector 19 detects a signal of adequate quality, the programmer/controller then monitors the decoder 17 for system code, block 184. If system code is present, the programmer/controller 26 resets the missed search counter 40 for that frequency, block 179, checks for presence of unit code, block 143, and proceeds just as when battery saver circuit is first enabled and signal quality is adequate.

If when the signal quality detector 19 first detects no signal or a signal of inadequate quality, the programmer/controller 26 reenables the battery saver on timer, block 180, clocks the address counter 23 to an active frequency, block 185, clocks the scan counter 37, block 186, and checks the scan count comparator 39, block 181, to determine if the scan count equals the count stored in the scan reference counter 38. If the counts are the same, the programmer/controller monitors the output of the signal quality detector 19, block 187, to determine if sufficient signal quality is present to decode a message. If the signal quality is too low, the programmer/controller locks on the battery saver circuit 51, block 145, and checks the next sequentially higher frequency, block 146, as previously described.

If the scan counter 37 data equals the scan count reference 37, block 181, and signal quality detector 19 indicates adequate signal, block 187, the programmer/controller 26 monitors the decoder for system code, block 183. If system code is present, the programmer/controller 26 resets the missed search counter 40 for that frequency, block 179, checks for presence of unit code, block 143, and proceeds just as when battery saver on mode is first enabled while signal quality is adequate.

If all frequencies are not inactive, block 173, the scan counter 37 does not equal the scan count reference 24, as checked by the scan count comparator 39, block 181, and signal quality is adequate as determined by the signal quality detector 19, block 182, and system code is not present, block 183, the battery saver circuit 51 is reenabled, block 180, and the same sequence is repeated as explained above.

If scan count does not equal scan count reference and signal quality is not adequate as determined by the signal quality detector 19, block 182, the battery saver 51 is reenabled, block 180, and the same sequence is repeated as explained above.

If scan count from the scan counter 37 does not equal maximum, and the signal quality detector 19 detects adequate signal, block 182, and system code is present, block 183, the programmer/controller 26 resets the search counter, block 179, and checks for unit code from the decoder 17, block 143, as previously explained.

If the scan count from the scan counter 37 does not equal maximum, and the signal quality detector 19 detects adequate signal, block 182, and system code is not present, block 183, the programmer/controller 26 reenables battery saver on timer 51, block 180, as previously explained.

When the programmer/controller 26 has sequentially searched all possible receivable frequencies and both the low and high SCA frequencies with each battery saver on pulse, the programmer/controller starts searching the possible transmitter frequencies again, starting with the lowest possible frequency.

Pager Receiver With Analog Voltage Frequency Synthesizer

Figures 9A, 11:
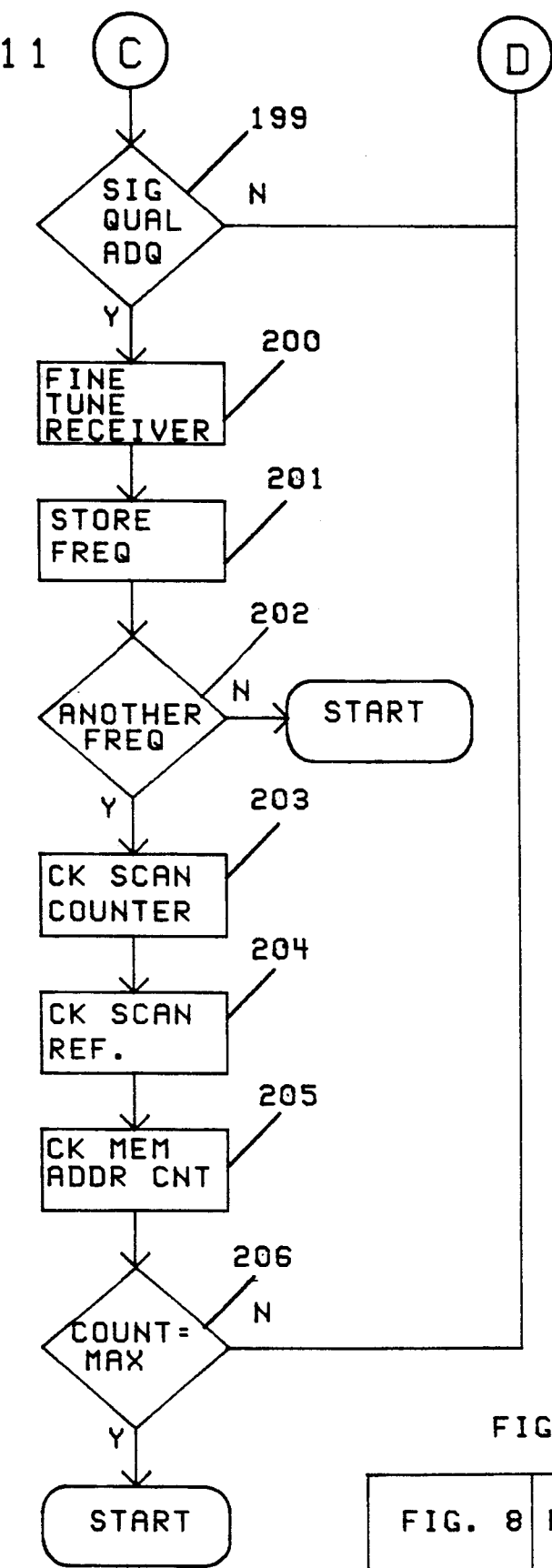

Referring to FIGS. 1, 8 and 9, arranged as shown in FIG. 9A, in accordance with a further embodiment for a pager receiver 10' provided by the present invention, the pager receiver 10' includes an analog voltage frequency synthesizer including tuning signal generator 22' and receiver 11 for tuning the pager receiver 10' to channels or frequencies as desired. The receiver 11 and control circuit 13 as well as elements of the tuning control circuit 12, other than the memory 21 and the tuning signal generator 22', are similar to or the same as corresponding circuits for pager receiver 10. Accordingly, corresponding circuits have been given the same reference numbers.

The embodiment of the pager receiver 10' includes a tuning signal generator 22' which comprises an analog voltage tuned circuit. The tuning signal generator 22' includes a frequency data digital to analog converter 61, an automatic frequency control digital to analog converter 62, and a presettable up/down counter 64 shown in FIG. 8, and a tuning voltage amplifier 63 with analog AFC input from receiver 15, and a center crossing detecting circuit 65 shown in FIG. 9.

The data memory 21 includes a four-bit AFC memory 31a for storing frequency data used in generating an automatic frequency control signal for fine tuning the pager receiver 10'.

The programmer/controller 26 has its read/write command output R/W additionally connected to the read/write control input of the AFC data memory 31a. Also, the programmer/controller has outputs CLOCK, RESET and PRESET connected to respective control inputs clock, reset and preset enable for the up/down counter 64. The up/down counter 64 has its count up/count down control input connected to the output of the center crossing detector 65, which is also connected through conductor 65a to an input of the programmer/controller 26. The input of the center crossing detector 65 is connected to the output of the first detector of receiver RF circuits 15.

The frequency data is applied to data inputs of the D/A converter 61 which generates an analog voltage corresponding to the reference frequency indicated by that reference data. This voltage is applied to the tuning voltage amplifier 63 which responsively generates a control voltage for the local oscillator 16 to establish the local oscillator frequency for the receiver 11 at the value needed to tune the pager receiver to the channel or frequency indicated by the frequency data.

A second signal input to the tuning voltage amplifier 63 is provided by the digital AFC D/A converter 62. The digital AFC D/A converter 62 generates an analog voltage corresponding to AFC frequency data read out of an AFC data memory 31a. This signal provides fine tuning of the local oscillator 16, and thus of the pager receiver and provides a degree of compensation for the affects of component aging and temperature drift. The digital AFC frequency data is updated only after a message has been received and the new AFC frequency is stored in the memory 31a for use in the next active cycle.

A third input to the tuning voltage amplifier 63 is the output of the analog AFC signal provided at the output of the first detector stage of the receiver 15.

The voltage from the frequency data D/A converter 61 has the broadest range and causes the greatest change in the tuning frequency for the receiver 11. For example, the frequency tuning range is typically 88 MHz to 108 MHz plus enough to allow for component tolerance. The voltage from the AFC D/A converter 62 has a narrower range, typically 200 KHz. This prevents inadvertent tuning to an adjacent channel during a fine tuning operation. The analog AFC control range is slightly more than one bit of the digital AFC digital signal or about 40 KHz.

For the purpose of updating the AFC frequency data to compensate for drift due to temperature or component aging, for example, the center crossing detector 65 generates an output signal each time that the receiver is cycled on. The output signal generated by the center crossing detector 65 sets the up/down counter 64 to either the count up or count down mode depending on whether the local oscillator signal being developed by the receiver 15 is slightly above or below the frequency needed to tune the desired frequency. If unit code is received, the message is detected and stored and then the programmer/controller 26 clocks the up/down counter 64 and stores the new count of the up/down counter 64 in the AFC memory 31a.

The digital AFC data is updated only when a page is received, but pages are received whenever adequate signal is detected when the pager receiver is operating in the preprogram mode or whenever adequate signal and system code is detected when the pager receiver is operating in the all channel scan mode.

A temperature drift correction circuit 70 including a thermistor 71 and a capacitor 72 enables the frequency data which identifies a selected channel or frequency to be altered to correct for temperature drift. Preferably, the pager receiver is factory programmed to alter the channel/frequency identification data by a ratio determined by the temperature sensing circuit. The thermistor 71 is connected between an input/output port 73 of the program controller and the on/off switch 43. The capacitor 72 is connected between input/output port 73 and ground.

To establish reference data, the pager receiver first is tuned to a mid band channel. Then, with the pager receiver at room temperature, the input/output port 73 is shorted to ground long enough to discharge the capacitor 72. Then with the short circuit removed, the input/output port 73 becomes an input and the programmer/controller 26 counts clock cycles until capacitor 72 is charged to a level high enough to cross the switching threshold of input/output port 73. The count is stored in the memory 31a. The procedure is then repeated with the pager receiver operating at a reference temperature.

Also at the reference temperature, the preset AFC counter 64 is pulsed until the center crossing detector 65 indicates that the pager has returned to center frequency. The number of pulses registered by the up/down counter 64 is stored in memory 31a.

The programmer/controller 26 is programmed to calculate a correction factor from the ratio of stored temperature change data to stored frequency change data in comparison to current temperature data as measured by the thermistor 71.

This correction factor enables the programmer/controller 26 to derive the number of counts by which the preset AFC counter 64 must be incremented or decremented from the count stored in memory 31a to compensate for the affects of temperature drift on tuning the receiver to a predetermined channel. In operation, at the end of each battery saver on cycle, the programmer/controller, 26, shorts I/O port 73 to ground thus discharging capacitor 72 then opens the short and counts clock cycles until capacitor 72 is charged as previously described and calculates from this count and the stored data a new number of counts by which the preset AFC counter 64 must be incremented or decremented from the count stored in memory 31a on the next battery saver on cycle.

Figure 10:
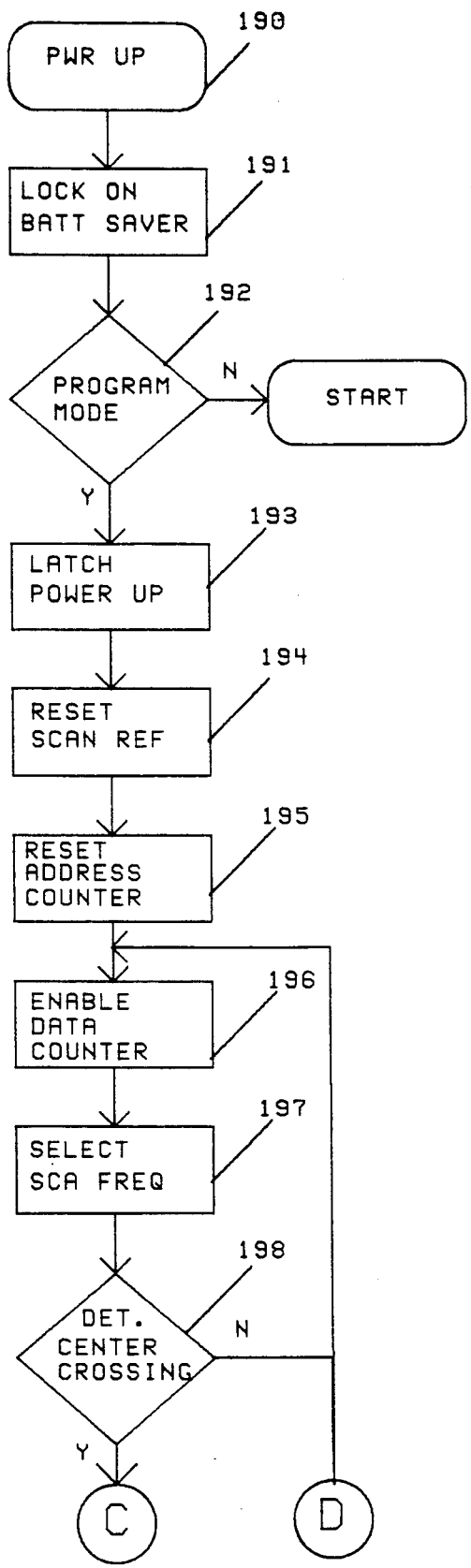
FIGS. 10 and 11 are a flow chart illustrating programming the analog tuned pager receiver illustrated in FIGS. 8 and 9 for operation in a preprogrammed mode.

Preprogrammed Pager Programming (FIGS. 10-11)

Referring to FIGS. 8-11, before entering the programming mode, the external programmer 28 is programmed for each RF frequency and SCA frequency to be received.

The programming mode is entered in response to operation of the on/off switch to energize the pager receiver. During power up, blocks 190,191, the external programmer switches the programmer/controller 26 to the program mode. When power is initially applied, the programmer/controller 26 enables the battery saver circuit 51, block 191, to maintain pulsed B+ on during programming. When the program mode is entered, block 192, the programmer/controller 26 sets its memory read/write output R/W to the write mode, enables output PRESET ENABLE to the presettable up/down AFC counter 64 and to the preset 33 to set the presettable up/down AFC counter 64 to the center of its counting range by loading into the counter the data stored in the preset 33. At the same time, the programmer/controller 26 sends a reset signal to scan counter reference 38, block 194, and memory address counter 23, block 195, and begins clocking the frequency data counter 35, block 196. The programmer/controller 26 also enables the buffers 34 and 34a.

The external programmer 28 sets the SCA frequency select line either high or low to select either the high or low SCA frequency, block 197, for each frequency for which the pager receiver is to be preprogrammed.

The eight bit signal output of the frequency data counter 35 is applied to the frequency data memory 31 through buffer 34, buffer 34a, and to the data inputs of D/A converter 61. The output of the D/A converter 61 is summed with a DC voltage from the AFC D/A converter 62 in the tuning voltage amplifier 63. The voltage output provided by the tuning voltage amplifier 63 is applied to the VCO and to the voltage tuned RF amplifier portion of the superheterodyne receiver 11 to change the VCO output frequency and the RF tuning for the receiver.

The output of the first detector of the RF stage 15 is applied to the SCA detector 18 and is also filtered and applied to the tuning voltage amplifier 63 as an analog automatic frequency control signal.

In the program mode, the programmer/controller monitors the SCA frequency select line from the external programmer and sets one bit of the ten bit frequency data either high or low.

As the programmer/controller 26 clocks the frequency data counter 21, the tuning voltage on the output of the tuning voltage amplifier 63 changes proportionately. The center crossing detector 65 provides an output when the DC level of the output of the first detector portion of the RF receiver stage 15 crosses over at center frequency, block 198. This output is applied to the programmer/controller 26 which stops clocking the frequency data counter 35.

Signal quality is checked, block 199, to ensure that the center crossing indication from block 199 is correct. If signal quality is not correct, the Data Counter, block 196, is enabled and the process is repeated.

When the center crossing detector 65 switches, its output signal sets the presettable up/down AFC counter 64 into the clock down mode. After a short delay, the programmer/controller 26 begins clocking the presettable up/down AFC counter 64 to obtain fine tuning data for this frequency, block 200. The output of the presettable up/down AFC counter 64 is applied to AFC D/A converter 62 and to the data input of the AFC data memory 31a. The data outputs of the AFC data memory 31a are connected through tristate buffer 34b to the preset inputs of the presettable up/down AFC counter 64 and the AFC D/A converter 62. The output of the AFC D/A converter 62 applies a DC voltage to the tuning voltage amplifier 63 which changes the VCO frequency approximately 40 KHz for each count of the presettable up/down AFC counter. The programmer/controller 26 continues to clock the presettable up/down AFC counter 64 until the VCO frequency is slightly below the desired local oscillator frequency which causes the center crossing detector to change state and stop the clocking of the presettable up/down AFC counter. The programmer/controller writes the frequency data provided by the counter, the SCA select bit from the programmer/controller 26, and the active channel bit into the ten bit frequency data memory 31, block 201. This is the coarse tuning frequency data for this frequency. When the frequency data has been stored, the programmer/controller sets the output buffer of the frequency counter 35 to the high impedance mode and applies a read command on output R/W to set the frequency data memory 31 to the read mode. The programmer/controller 26 then sends a write pulse to the AFC data memory 31a, block 201, to store the final four bits of tuning data, the fine tuning data for this frequency. The programmer/controller 26 then sends a tuning complete signal to the external programmer 28.

When the external programmer 28 receives a tuning complete signal, it responsively changes its transmitter frequency data to that for the next frequency to be tuned and applies a pulse to the input CONTINUE PROGRAMMING, block 202. If there are no more frequencies to be tuned, the external programmer applies a pulse to the input END PROGRAMMING returning the pager receiver to the operation mode. The programmer/controller responds to the end programming signal and stores the count in the scan count reference counter 38.

Thus, when the input CONTINUE PROGRAMMING is pulsed, the programmer/controller 26 clocks the scan counter, block 203, the scan reference counter 38, block 204, and the memory address counter 23, block 205, to the next memory address. The memory address counter 23 supplies the address locations for the frequency data memory 31 and the AFC data memory 31a. The tuning sequence is then repeated as previously described until the maximum number of frequencies have been programmed, block 206.

When the input END PROGRAMMING is pulsed, the programmer/controller 26 resets the memory address counter 23 and returns the pager receiver circuits to the battery saver off mode.

Figure 12:
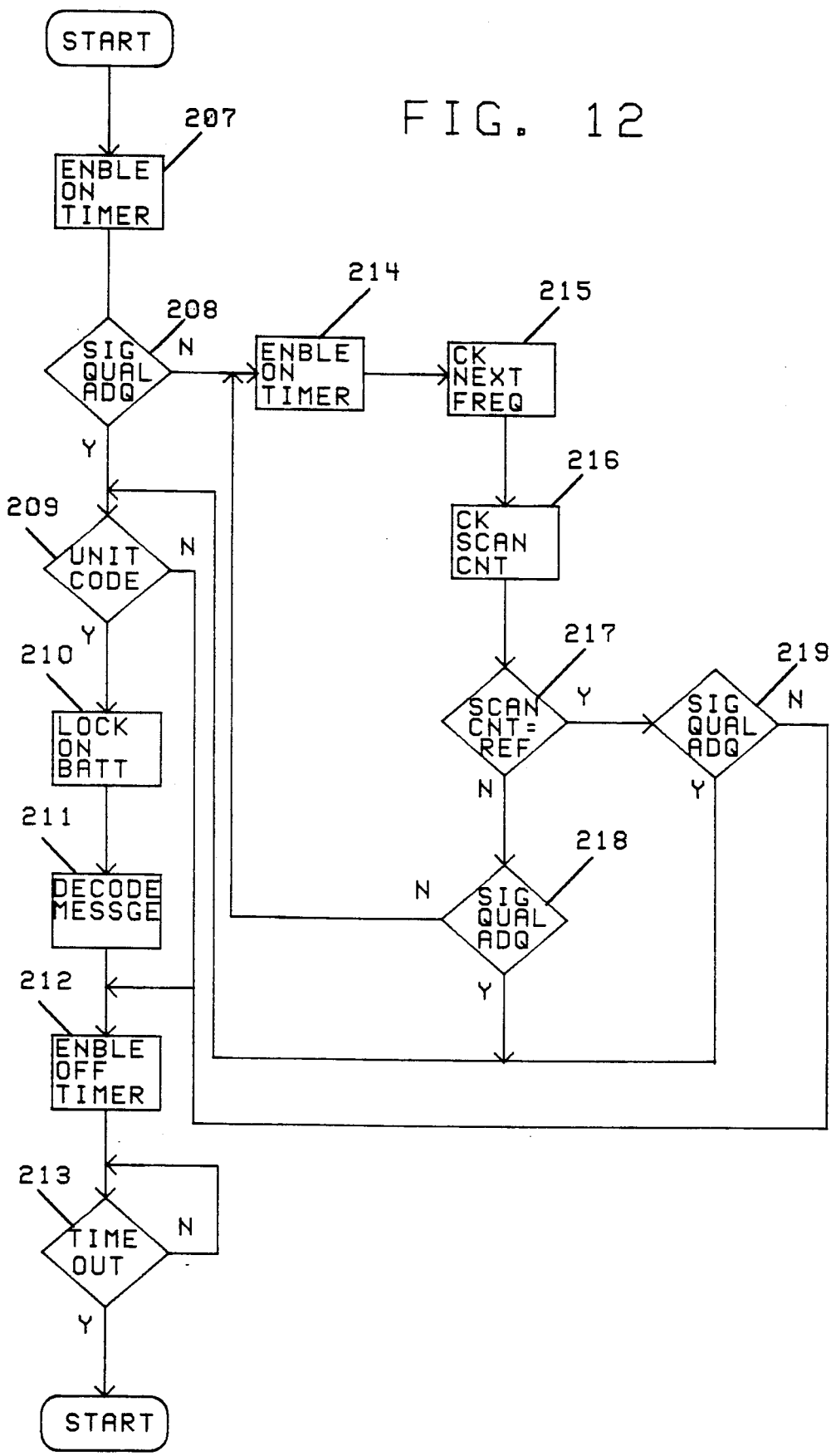
FIG. 12 is a flow chart illustrating the operation of the analog tuned pager receiver in the preprogrammed mode.

Preprogrammed Pager Operation (FIG. 12)

Referring to FIGS. 8, 9 and 12, when the pulsed B+ voltage is enabled, block 207, the memory address counter 23 addresses the frequency data memory 31 and the AFC data memory 31a with the address of the memory locations storing the digital tuning voltage for the last frequency sampled. The frequency data read out is applied respectively to the D/A converter 61 and the AFC D/A converter 62. The DC voltages are summed with the output of the analog AFC signal output of the first detector in receiver 15 in the tuning voltage amplifier 63.

The output voltage from the tuning voltage amplifier 63 is applied to the voltage tuned receiver 15 causing the local oscillator to generate the proper frequency to receive the appropriate transmitter. If the signal quality detector 19 detects adequate SCA signal quality to receive a message, block 208, the battery saver on timer on period is extended by the programmer/controller long enough to decode the unit code if it is present. If the unit code is present, block 209, the decoder 17 signals the battery saver circuit 51, block 210, to maintain the pulsed B+ until the message has been received and stored, block 211. When the message is being received the center crossing detector 65 sets the presettable up/down AFC counter 64 either in the clock up or clock down mode, depending on whether the VCO frequency is slightly below or above the local oscillator frequency needed to receive the transmitter. After the message is stored, the programmer/controller 26 clocks the presettable up/down AFC counter 64 and writes the new four bit count into the AFC data memory 31a. The programmer/controller 26 then disables the timer which terminates the pulsed B+ and enables the battery saver off timer, block 212, which maintains the pager receiver in its low power idle mode until the timer times out, block 213.

If at block 208, the signal quality detector 19 does not detect a signal of minimum signal quality to detect data, the signal quality detector 19 signals the programmer/controller to reset the battery saver on timer to give the receiver another full pulsed B+ on time, block 214. Also, the programmer/controller clocks the memory address counter 23 to the next address, block 215. This causes stored tuning data in the new address to be output through the D/A converters and cause the VCO to change to a new receive frequency. The programmer/controller also clocks the scan counter, clock 216. Then a test is made, block 217, to determine if the scan count equals the reference count. If after changing to the new frequency the scan count equals the scan count reference and the signal quality detector 19 detects adequate SCA signal quality to decode data, block 219, the decoder 17 checks for unit code, block 209, and responds as previously described.

If after changing to the new frequency the signal quality detector 19 does not detect adequate SCA signal quality, the programmer/controller 26 changes frequency as previously described, blocks 214,215.

If the memory address counter 23 has been clocked the same number of times as the number of frequencies stored, as indicated by the count of the scan counter 37, and if a signal of adequate quality is not present, the programmer/controller 26 enables the battery saver off timer, block 212, returning the pager receiver to the low power idle mode.

Figure 13:
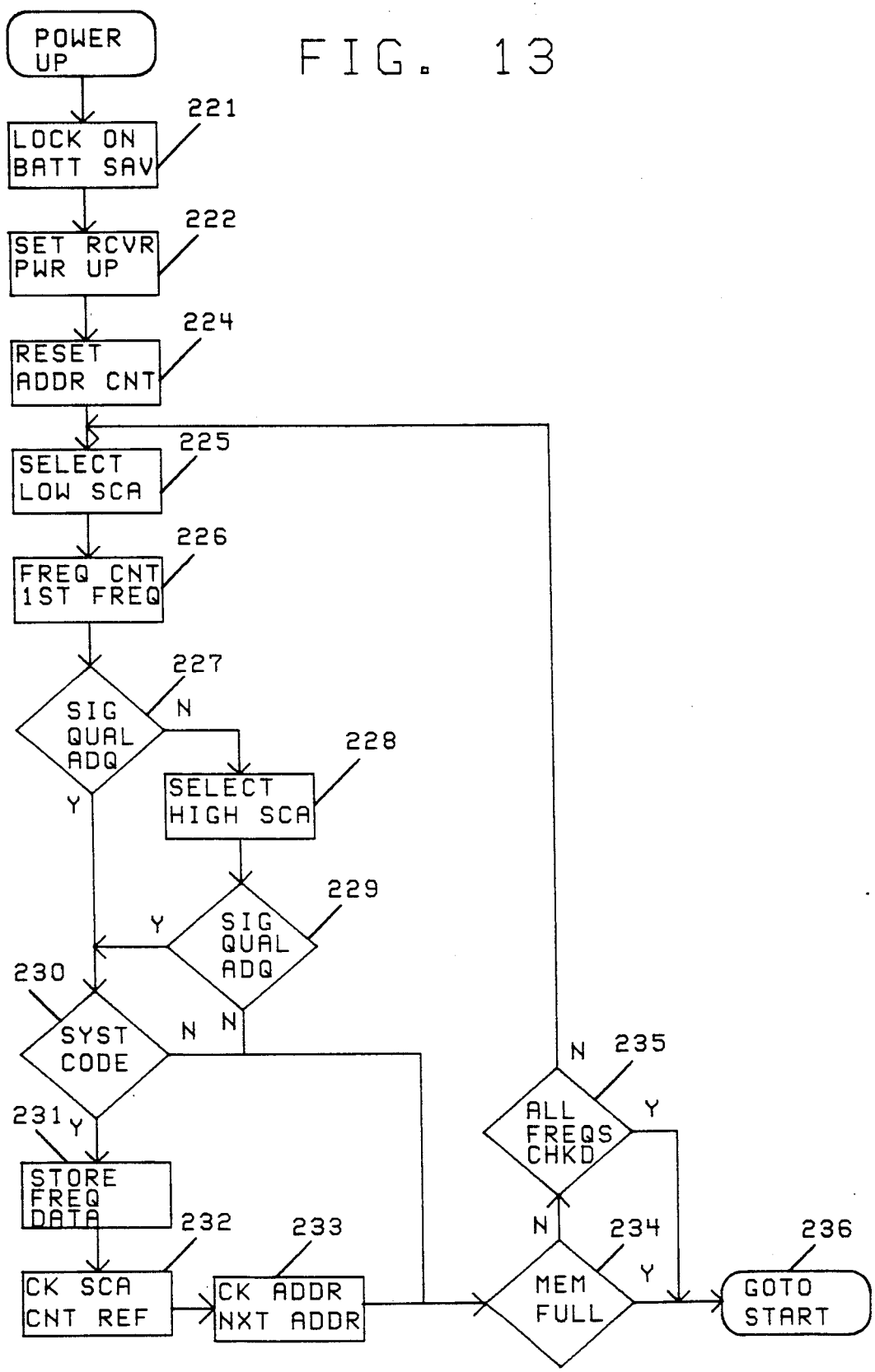
FIG. 13 is a flow chart illustrating programming the analog tuned pager receiver for operation in a scanning mode; and, FIGS. 14-15 are a flow chart illustrating the operation of the analog tuned pager receiver in the scanning mode.

Scanning Pager Programming (FIG. 13)

Referring to FIGS. 8, 9 and 13, if the pager receiver has been programmed to operate in the all channel scanner mode and the on/off switch 43 is switched from off to on, the programmer/controller 26 enables the power up latch, block 221, which sets the pager receiver in the power up mode, block 222. This causes the programmer/controller 26 to enable the battery saver circuit to maintain pulsed B+ during power up programming for the all channel scan mode of operation. The programmer/controller 26 sets the memory R/W output to the write mode, sets the presettable up/down AFC counter 64 to the preset mode, and clocks the memory preset 33. This causes the memory preset data to be clocked through the AFC memory 31a, through buffer 34b and into the preset inputs of the presettable up/down AFC counter 64 which sets the presettable up/down AFC counter 64 to the center of its counting range. At the same time, the programmer/controller 26 enables output RESET to the memory address counter 23, block 224, and to the scan counter reference 38 and begins clocking the eight bit frequency data counter 35. The programmer/controller 26 also enables the buffers 34b and 34a and sets the SCA frequency bit select 18a to receive the low SCA frequency, block 225.

The output of the eight bit frequency counter 35 is applied through the eight bit buffer 34 to the buffer 34a and to the D/A converter 61. The output of buffer 34a applies the data from the eight bit frequency counter 35 to the frequency data memory 31. The output of the D/A converter 61 is summed with the DC voltage from the AFC D/A converter 62 in the tuning voltage amplifier 63. The output voltage from the tuning voltage amplifier 63 controls the VCO and voltage tuned RF amplifier to change the VCO frequency and RF tuning of the pager receiver. The analog signal output of the first detector of the receiver 15 is applied to the SCA detector 18 and is also filtered and applied to the tuning voltage amplifier 63 as an analog automatic frequency control signal.

In programming for the all channel scan mode, the programmer/controller 26 first selects the low SCA frequency by setting the low frequency select bit. The programmer/controller sets the active/inactive bit to active state.

The programmer/controller 26 clocks the frequency data counter 35, block 226. As the programmer/controller 26 clocks the eight bit frequency data counter 35, the tuning voltage on the output of the tuning voltage amplifier 63 changes proportionately until the center crossing detector 65 detects that the DC level of the output of the first detector has crossed over the DC level obtained when the VCO is properly tuned for receiving the strong signal present at the receiver's antenna input. The output of the signal quality detector 19 is monitored by the programmer/controller, block 227. If the signal quality detector 19 does not indicate that a signal of adequate quality to receive a message is present, the programmer/controller 26 selects the high SCA frequency, block 228. If the signal quality detector 19 still does not detect a quality signal, block 229, and the memory is not full, block 234, and all frequencies have not been scanned, block 235, the programmer/controller 26 selects the low SCA frequency again, block 225, and clocks the eight bit frequency counter 35 to the next frequency, block 226.

When the center crossing detector 65 detects that the receiver 15 has tuned passed a strong frequency and a signal of adequate quality is detected by the signal quality detector on either of the SCA frequencies, the eight bit frequency counter 35 stops counting. Next, the programmer/controller 26 monitors the system code detection output from the decoder 17, block 230. If system code is not detected, the programmer/controller 26 selects the low SCA frequency and clocks the eight bit frequency counter 35 to the next frequency. If the system code is detected, the programmer/controller 26 enables the eight bit buffer 34 and writes the counter 35 output and the two bits from the programmer/controller 26 into the ten bit frequency data memory 31, block 231, and the missed search memory 41. Once the data has been stored, the output buffer of the eight bit frequency counter 35 is set to the high impedance mode and the nine bit frequency data memory 31 is set to the read mode. The memory address counter 23 and scan reference counter 38 are clocked, blocks 232,233, by the programmer/controller.

If all of the memory locations are not full, block 234, and if the pager receiver has not scanned through its entire frequency range, block 235, the tuning procedure is repeated as previously described with the eight bit frequency counter 35 continuing to count from where counting stopped.

When either all memory locations are full or the pager receiver has been tuned through all possible frequencies, the programmer/controller 26 resets the power up latch 53 and enables the battery saver off timer.

When the center crossing detector 65 switched, its output caused the presettable up/down AFC counter 64 to be put into the clock down mode. After a short delay, the programmer/controller 26 clocks the presettable up/down AFC counter 64. The output of the presettable up/down AFC counter 64 is applied to a AFC D/A converter 62 and to the data input of the AFC data memory 31a. The output of the four bit AFC data memory 31a is extended through tristate buffer 34b to the preset inputs of the presettable up/down AFC counter 64 and the inputs of the AFC D/A converter 62.

The analog signal output of the four bit AFC D/A converter 62 is applied to the tuning voltage amplifier 63 which changes the VCO frequency approximately 40 KHz for each count of the presettable up/down AFC counter 64. The programmer/controller 26 continues to clock the presettable up/down AFC counter 64 until the VCO frequency is slightly below the desired local oscillator frequency which causes the output of the center crossing detector 65 to change state. When the output of the center crossing detector changes state, the programmer/controller 26 stops clocking the presettable up/down AFC counter 64. The programmer/controller 26 then enables its output R/W to extend a write pulse to the four bit AFC data memory 31a to store the final four bits of tuning data.

Figure 14:
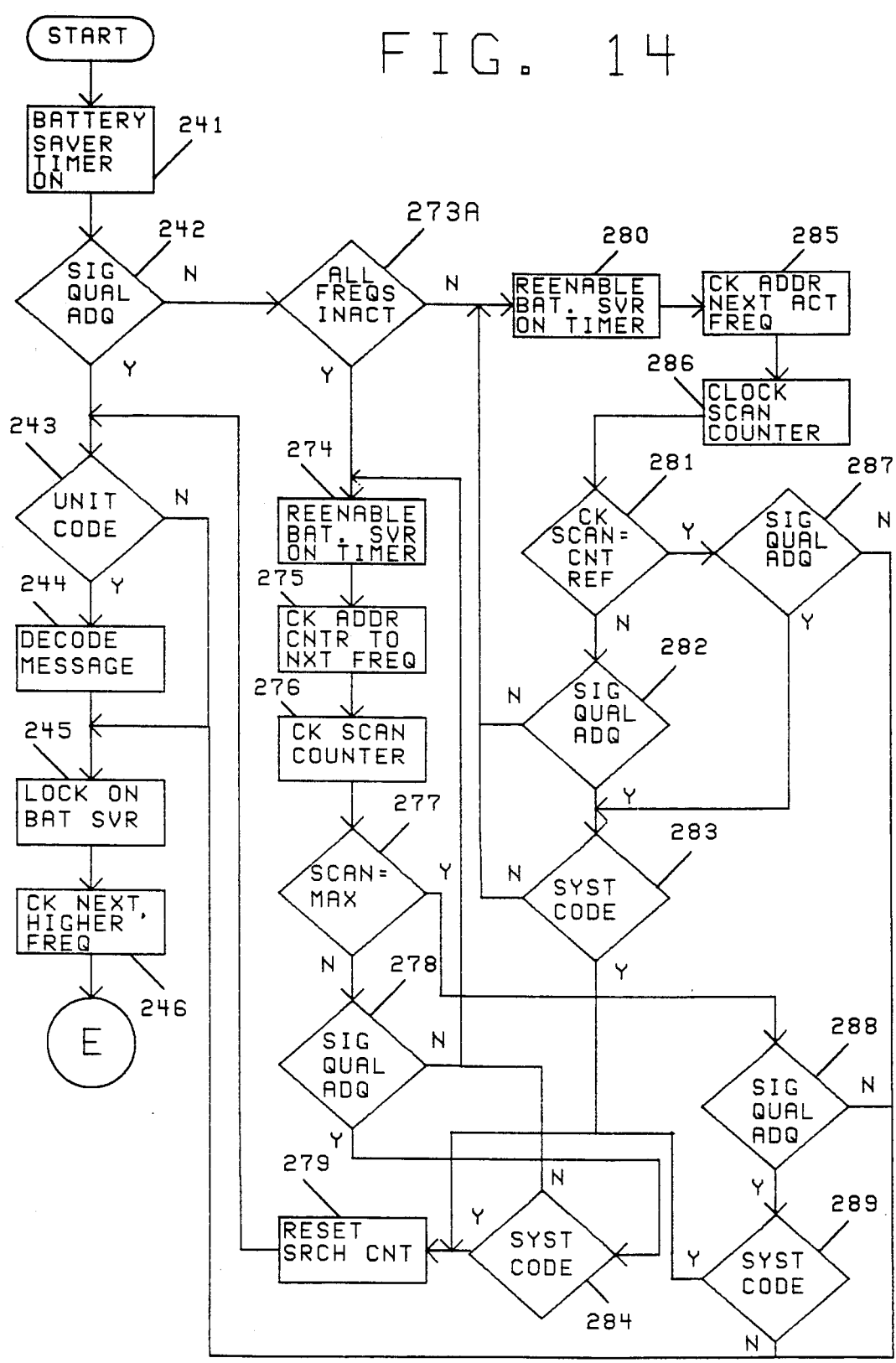
Figure 15:
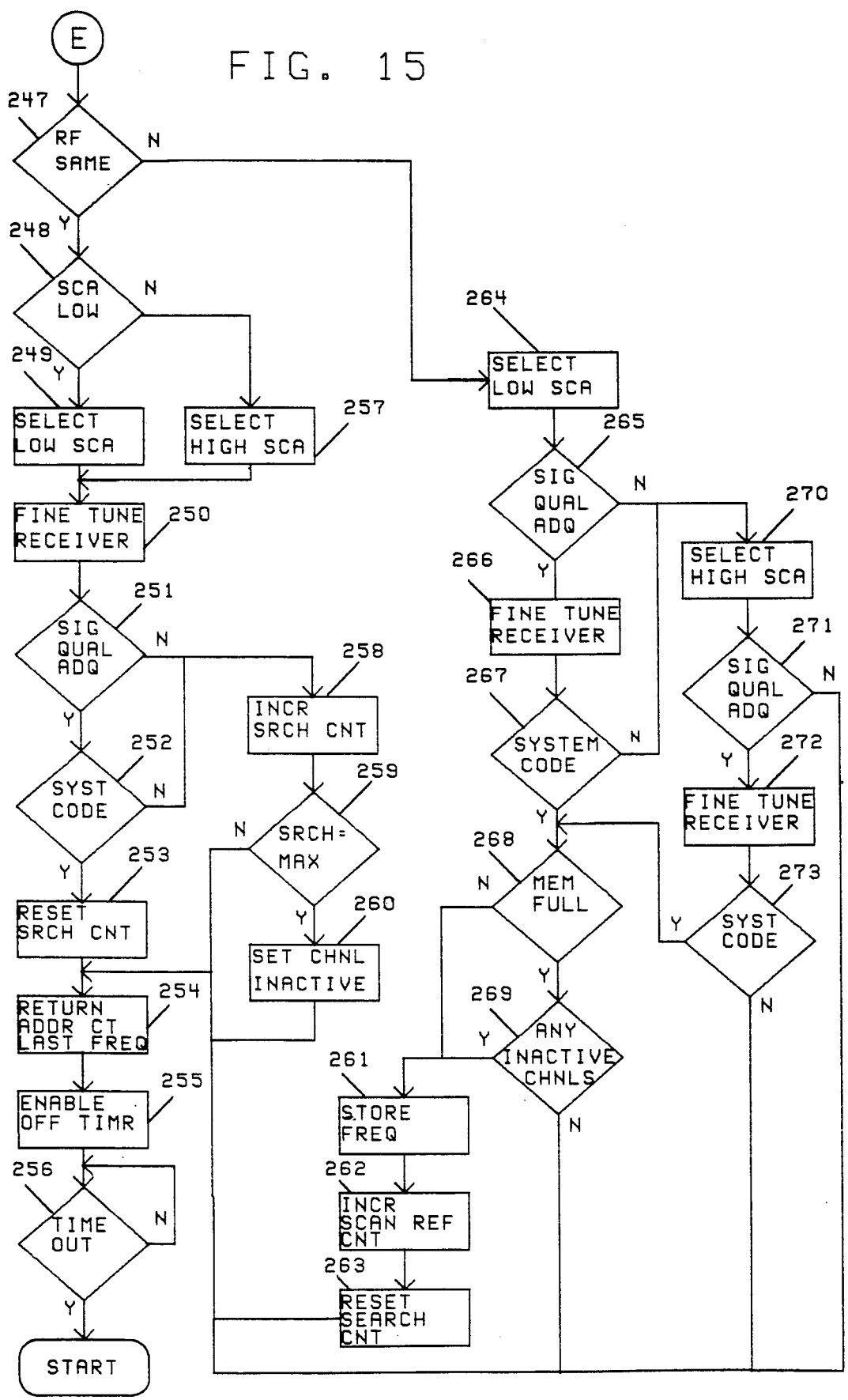

Scanning Pager Operation (FIGS. 14–15)

Referring to FIGS. 8, 9 and 14–15, after the pager receiver has been programmed with selected channel frequency data, the pager receiver initiates scan operation at the next active period of the cycle timer 27. When the pulsed B+ voltage is turned on at the start of the next active period, block 241, the memory address counter 23 addresses the nine bit frequency data memory 31, the missed search memory 44 and the four bit AFC data memory 31a with the address of the memory location storing the digital tuning voltage for the last frequency sampled. This data is applied to the D/A converter 61 and the AFC D/A converter 62. The DC voltages are summed with the output of the analog AFC in the tuning voltage amplifier 63.

The output voltage from the tuning voltage amplifier 63 is applied to the voltage tuned receiver 15 causing the local oscillator to generate the proper frequency to receive the appropriate transmitter. If the signal quality detector detects adequate SCA signal to receive a message, block 242, the programmer/controller enables the battery saver on timer to extend its on time long enough to decode the unit code if it is present, block 243. If the unit code is present, the decoder 17 signals the battery saver to maintain the pulsed B+ on until the message has been received and stored, block 244. When the message is being received, the output of the center crossing detector 65 sets the presettable up/down AFC counter 64 either in the clock up or clock down mode, depending on whether the VCO frequency is slightly below or above the local oscillator frequency needed to receive the transmitter. After the message is stored, the programmer/controller 26 clocks the presettable up/down AFC counter 64 and writes the new four bit count from the presettable up/down AFC counter 64 into the four bit AFC data memory 31a.

The programmer/controller 26 then enters a routine to check the next channel sequentially higher than the last channel clocked into the eight bit D/A converter 61 by the eight bit frequency counter 35, block 246. The programmer/controller 26 clocks the eight bit frequency counter 35 to the next frequency, enables the buffers 34 and 34a, presets the presettable up/down AFC counter 64 and enables the output of the eight bit frequency counter 35. The programmer/controller 26 then determines if the frequency is the same as any stored frequency, block 247. If the frequency is the same, the programmer/controller 26 determines if the SCA select bit is set for the low SCA frequency, block 248, and if so, selects the low SCA frequency, block 249. If it is not set for the low SCA frequency, the programmer/controller 26 selects the high SCA frequency, block 257. The frequency data read out of the memory is applied to the D/A converters 61 and 62.

When the output of the center crossing detector 65 changes state and the signal quality detector 19 detects a SCA signal of adequate quality to receive a message, the programmer/controller 26 fine tunes the frequency data, block 250 by clocking the presettable up/down AFC counter 64 until the output of the center crossing detector 65 changes state again. The programmer/controller then checks for adequate signal quality from the signal quality detector 19, block 251, and checks for system code from the decoder 17, block 252. If both are present, the programmer/controller 26 then resets the missed search counter 40 for that frequency, block 253, and stores the new four bit AFC data in the four bit AFC data memory 31a. If the output of the center crossing detector 65 does not change state, if the signal quality detector 19 does not detect sufficient signal quality to receive a message, or if system code is not present the programmer/controller 26 increments the missed search counter 40, block 258. If the missed search count equals the maximum number of misses allowed without receiving a signal of adequate quality, block 259, the programmer/controller 26 sets the active/inactive bit for that frequency to inactive, block 260, and decrements the scan reference counter 38. The programmer/controller 26 then returns the memory address counter 23 to the last used active frequency and turns on the battery saver off timer, blocks 254,255.

If the frequency is not the same as any stored frequency, the programmer/controller 26 selects the low SCA frequency, block 264, and checks the signal quality detector for adequate signal to be detected, block 265. If adequate signal is not detected, the programmer/controller 26 selects the high SCA frequency and again checks for adequate signal, blocks 270,271. If adequate signal quality is detected with either SCA frequency, the programmer/controller 26 clocks the presettable up/down AFC counter, until the center crossing detector 65 changes states again to fine tune the receiver, blocks 266 and 272.

Next, the programmer/controller 26 checks the decoder 17 to determine if the system code is present, block 273. If system code is present, the programmer/controller 26 determines if the address memory 23 is full, block 268. If the memory is full, then the frequency data memory 31 is checked to determine if any channels are inactive, block 269. If none are, the programmer/controller 26 then returns the memory address counter 23 to last used memory address and turns on the battery saver off timer, blocks 254,255, and the operation continues as previously described.

If the address memory 23 is not full, block 268, or an inactive channel is found, block 269, the programmer/controller stores the eight bit frequency data, four bit AFC data, the SCA select bit, and the active frequency bit, block 261. The programmer/controller 26 then increments the scan reference counter 37, block 262, returns the memory address counter 23 to the last used active frequency, block 254, and turns on the battery saver off timer, block 255.

If the signal quality detector 19 does not find adequate signal quality, block 271, the decoder 17 does not detect system code, block 273, or the search is not maximum, block 259, the programmer/controller 26 returns address counter 23 to last used frequency, block 254, and the operation continues as previously explained.

If signal quality is adequate, block 265, the programmable controller clocks the presettable up/down AFC counter until the zero crossing detector 65 switches low which fine tunes the receiver, block 266. The programmer/controller then checks for system code from the decoder 17, block 267. If system code is found the programmer/controller checks frequency memory 31 to determine if memory is full, block 268. The operation then continues as previously described.

If system code is not found, block 267, the programmer/controller switches the SCA select 65 to select the high SCA frequency, block 270.

Referring to FIGS. 8, 9 and 14, if, when the battery saver on timer enables the pulsed B+, the signal quality detector 19 indicates a signal of adequate quality to receive a message is not present, block 242, the programmer/controller 26 checks the missed search memory 41 until it finds an active frequency, block 273a. If all frequencies are inactive, that is all active/inactive bits have been set to the inactive state due to repeatedly missing all stored frequencies, the programmer/controller 26 ignores the active/inactive bits, resets the battery saver on timer, block 274, to start timing a new on cycle time, clocks the memory address counter 23 to the first frequency stored, block 275, and checks the signal quality detector to determine if a signal of adequate quality is present, blocks 274-278. If an adequate signal is present, the programmer/controller 26 checks the decoder 17 for system code, block 284. If system code is present, the programmer/controller 26 resets the missed search counter 40 for that frequency, block 279, sets the active/inactive bit for that frequency to active and checks for unit code to be decoded, block 243, and proceeds as previously described. If an adequate signal was not present when the first frequency was clocked in by the memory address counter 23, the programmer/controller resets the battery saver on timer to start timing another on cycle time and the memory address counter 23 clocks in each stored frequency, block 275, while monitoring for adequate signal quality from the signal quality detector until it finds an adequate signal or until the scan counter 37 equals the scan reference counter. If after checking all stored frequencies, block 277, no frequency with adequate signal quality and system code is found, blocks 288,289, the programmer/controller 26 locks on the battery saver circuit, block 245, and clocks in one sequentially higher frequency, block 246, as previously described.

If all frequencies stored are not inactive, the programmer/controller 26 reenables the battery saver on timer, block 280, clocks the memory address counter 23 to the next active address, block 285, and clocks the scan counter, block 286. The programmer/controller 26 determines if the scan count comparator indicates that the scan count equals the scan reference count, block 281, and if not, checks the signal quality detector for a signal of adequate quality, blocks 282. If a signal of adequate quality is not present, the programmer/controller 26 reenables the battery saver on timer, block 280, clocks the memory address counter to the active frequency, block 285, and clocks the scan counter, block 286. If the scan count comparator indicates that the count registered by the scan counter 37 equals that of the scan counter reference 38, block 281, the programmer/controller 26 checks for adequate signal quality as above, block 287. If adequate signal is still not present, the programmer/controller 26 enters into the sequentially higher channel search mode as described above, blocks 245,246.

If the signal quality detector 19 detects a signal of adequate quality to receive a message, the decoder, 17 determines if the proper unit code is present, block 243, and proceeds as previously described just as when the battery saver on timer was initially enabled, blocks 244-246.

After checking a sequentially higher frequency, the programmer/controller 26 sets the memory address counter to the last used frequency address and enables the battery saver off timer.

I claim:

1. A pager receiver for receiving paging signals on a plurality of channels comprising signal receiving means including a local oscillator and tuning circuit means tunable to all of said channels and signal detecting means for detecting a paging signal on a channel to which said tuning circuit means is tuned; tuning data generating means; data memory means having a plurality of addressable data storage locations; control means operable in a programming mode to enable said tuning data generating means to generate frequency data words identifying all of said channels in sequence, tuning signal generating means responsive to the frequency data words to cause said tuning circuit means to be tuned to all of said channels in sequence, said control means being responsive to said signal detecting means to select from said plurality of channels all of the channels on which a paging signal is detected and to store in said data memory means the frequency data words identifying the selected channels; said control means thereafter being operable in a scanning mode to read out of said data memory means in sequence the frequency data words identifying the selected channels until a paging signal is detected; said tuning signal generating means being responsive to each frequency data word read out of said data memory means for generating a control signal corresponding to a reference frequency indicated by the frequency data word, digital frequency compensation means for generating a digital frequency control signal to effect fine tuning of the local oscillator, analog frequency compensation means coupled to said signal receiving means for generating an analog frequency control signal, and signal combining circuit means responsive to said control signals to generate a control voltage for said local oscillator to establish the local oscillator frequency at the value needed for tuning said tuning circuit means to the selected channel identified by the frequency data word, said control means being responsive to the detection of a paging signal by said signal detecting means to cause said tuning circuit means to be maintained tuned to the selected channel identified by the data word being applied to said tuning signal generating means; and signaling means responsive to the detected paging signal for providing an indication that a paging signal has been detected.

2. A pager receiver according to claim 1, including cycle timing means for defining operating cycles for the pager receiver, each operating cycle including an active period of a given duration and a low power period of a substantially greater duration.

3. A pager receiver according to claim 1 wherein said signal receiving means operates under the control of said control means to detect paging signals independent of system code.

4. A pager receiver according to claim 1, wherein said tuning signal generating means includes first and second digital to analog conversion circuits, said first digital to analog conversion circuit being responsive to each frequency data word read out of said data memory means to provide a first analog control signal corresponding to a reference frequency indicated by the frequency data word, and said second digital to analog conversion circuit being responsive to a digital frequency correction data word generated by said digital frequency compensation means to generate a second analog control signal corresponding to a compensation signal indicated by said digital frequency correction data word, said signal combining circuit means being responsive to said first and second analog control signals and to said analog frequency control signal to generate said control voltage for said local oscillator.

5. A pager receiver according to claim 4, wherein said tuning signal generating means includes modifying means for modifying the digital frequency correction data word to cause a corresponding change in the second analog control signal for fine tuning of said tuning circuit means to each channel.

6. A pager receiver according to claim 4, wherein said tuning signal generating means includes signal level detecting means deriving from said signal receiving means a signal for updating said digital frequency correction data word.

7. A pager receiver according to claim 4, including sensing means for sensing ambient temperature and providing a temperature signal representing the temperature sensed, said control means being responsive to said temperature signal for adjusting said digital frequency correction data word to thereby adjust the fine tuning of said local oscillator in correspondence with temperature variation.

8. A pager receiver according to claim 7, wherein said sensing means comprises a device having a resistance that varies as a function of temperature and a capacitor connected in circuit with said device across inputs of said control means.

9. A pager receiver for receiving paging signals on a plurality of channels comprising signal receiving means including tuning circuit means tunable to all of said channels and signal detecting means for detecting paging signals on a channel to which said tuning circuit means is tuned; tuning data generating means; data memory means; control means operable in a programming mode to enable said tuning data generating means to generate data words identifying all of the said channels in sequence, tuning signal generating means responsive to the data words as they are generated to cause said tuning circuit means to be tuned to all of said channels in sequence, said control means being responsive to said signal detecting means to select from said plurality of channels all of the channels on which a paging signal is detected and to store in said data memory means the data words identifying the selected channels, said control means thereafter being operable in a scanning mode for controlling said data memory means to read out of said memory means in sequence the stored data words identifying the selected channels for application to said tuning signal generating means to cause said tuning circuit means to be tuned to the selected channels in sequence, said control means being responsive to said signal detecting means to stop reading out the data words when a paging signal is detected on one of said selected channels; and signalling means responsive to the detected paging signal for providing an indication that a paging signal has been detected, said control means including reference means for indicating the total number of active selected channels that are identified by data words stored in said memory means, scan count means for storing a count indicating the total number of active selected channels that have been scanned during a given operating sequence for the pager receiver and means responsive to said reference means and said scan count means for indicating when all of said active selected channels have been scanned during said given operating sequence.

10. A self-programming pager receiver for receiving paging signals on a plurality of channels comprising signal receiving means including tuning circuit means tunable to all of said channels and signal detecting means for detecting paging signals on a channel to which said tuning circuit means is tuned; tuning data generating means; data memory means; control means responsive to the application of power to the pager receiver, and independent of externally generated programming command signals which preselect channels to be scanned, to automatically begin operating in a programming mode to enable said tuning data generating means to generate data words identifying all of said channels in sequence, tuning signal generating means responsive to the data words as they are generated to cause said tuning circuit means to be tuned to all of said channels in sequence, said control means being responsive to said signal detecting means to select from said plurality of channels all of the channels on which a paging signal is detected and to store in said data memory means the data words identifying the selected channels, said control means thereafter being operable in a scanning mode for controlling said data memory means to read out of said memory means in sequence the stored data words identifying the selected channels for application to said tuning signal generating means to cause said tuning circuit means to be tuned to the selected channels in sequence, said control means being responsive to said signal detecting means to stop reading out the data words when a paging signal i detected on one of said selected channels and signalling means responsive to the detected paging signal for providing an indication that a paging signal has been detected.

11. A pager receiver according to claim 10, wherein said tuning signal generating means comprises a digital to analog converter responsive to each data word as it is read out of said memory means for generating an analog tuning signal for causing said tuning circuit means to tune to the channel identified by said data word.

12. A pager receiver according to claim 10, wherein said tuning signal generating means comprises a phase locked loop.

13. A pager receiver according to claim 10, including cycle timing means for defining operating cycles for the pager receiver, each operating cycle including an active period of a given duration and a low power period of a substantially greater duration.

14. A pager receiver for receiving paging signals on a plurality of channels comprising signal receiving means including tuning circuit means tunable to all of said channels and signal detecting means for detecting a paging signal on a channel to which said tuning circuit means is tuned; tuning data generating means including digital signal counting means for generating data words identifying all of said channels; data memory means having a plurality of addressable data storage locations; control means operable in a programming mode for incrementing said digital signal counting means to generate data words identifying each channel of said plurality of channels in sequence; tuning signal generating means responsive to each data word as it is generated for generating a control signal for tuning said tuning circuit means to the channel identified by the data word; said control means being responsive to said signal detecting means to select from said plurality of channels all of the channels on which a paging signal is detected and to store in said memory means the data words identifying, the selected channels and said control means thereafter being operable in a scanning mode to cause the stored data words to be read out from the memory means in sequence for application to said tuning signal generating means, said tuning signal generating means responding to each data word as it is read out of said memory means to tune the pager receiver to the selected channel identified by the data words read out from said memory means; and signalling means responsive to the detected paging signal for providing an indication that a paging signal has been detected.

15. A pager receiver according to claim 14, wherein said signaling means includes signal decoding means for decoding a detected paging signal for a given channel identified by a data word stored in said memory means, said control means when operating in said scanning mode being responsive to said decoding means to cause a sequentially higher channel of all of said channels to be scanned for the presence of a paging signal, and said control means being responsive to the detection of a paging signal on said sequentially higher channel to determine whether or not said sequentially higher channel is one of said selected channels and to store in said memory means, the data word identifying said sequentially higher channel upon determining that said sequentially higher channel is not one of said selected channels.

16. A pager receiver according to claim 15, which includes means for comparing the data word identifying said sequentially higher channel generated by said tuning data generating means with each data word stored in said memory means prior to storing in said memory means the data word identifying said sequentially higher channel to determine whether or not said sequentially higher channel is one of the selected channels.

17. A pager receiver comprising signal receiving means including signal detecting means for detecting paging signals in a plurality of channels; tuning circuit means for determining the receiving frequency in accordance with an analog control signal applied thereto; tuning data generating means for generating digital frequency data words identifying all of the channels; data memory means having a plurality of addressable locations for storing digital frequency data words for identifying selected ones of the channels, and addressing means for selectively addressing said storage locations in said memory means in sequence to effect readout of the frequency data words stored therein; digital to analog converting means for converting each digital frequency data word read out of said memory means into an analog signal for application to said tuning circuit means for establishing the receiving frequency for the pager receiver during a given operating cycle; frequency control means for modifying each frequency data word to compensate for variations in a frequency value represented by each frequency data word relative to the receiving frequency.

18. A pager receiver for receiving paging signals on a plurality of channels comprising signal receiving means including tuning circuit means tunable to all of said channels and signal detecting means for detecting paging signals on a channel to which said tuning circuit means is tuned; tuning data generating means; data memory means; control means operable in a programming mode to enable said tuning data generating means to generate data words identifying all of the said channels in sequence, tuning signal generating means responsive to the data words as they are generated to cause said tuning circuit means to be tuned to all of said channels in sequence, said control means being responsive to said signal detecting means to select from said plurality of channels all of the channels on which a paging signal is detected and to store in said data memory means the data words identifying the selected channels, said control means thereafter being operable in a scanning mode for controlling said data memory means to read out of said memory means in sequence the stored data words identifying the selected channels for application to said tuning signal generating means to cause said tuning circuit means to be tuned to the selected channels in sequence, said control means being responsive to said signal detecting means to stop reading out the data words when a paging signal is detected on one of said selected channels; and signaling means responsive to the detected paging signal for providing an indication that a paging signal has been detected, said signaling means including signal decoding means for decoding a detected paging signal for a given channel identified by a data word stored in said memory means, said control means when operating in said scanning mode being responsive to said decoding means to cause a sequentially higher channel of all of said channels to be scanned for the presence of a paging signal, and said control means being responsive to the detection of a paging signal on said sequentially higher channel to determine whether or not said sequentially higher channel is one of said selected channels and to store in said memory means the data word identifying said sequentially higher channel upon determining that said sequentially higher channel is not one of said selected channels.

19. A pager receiver according to claim 18, which includes means for comparing the data word identifying said sequentially higher channel generated by said tuning data generating means with each data word stored in said memory means prior to storing in said memory means the data word identifying said sequentially higher channel to determine whether or not said sequentially higher channel is one of the selected channels.

20. A pager receiver according to claim 18, which includes missed search means for indicating the number of times that said signal detecting means failed to detect a paging signal on a given one of said selected channels while said tuning circuit means is tuned to that channel.

21. A pager receiver according to claim 9, including means responsive to said missed search means for preventing said control means from reading the data word out of said memory means for a channel for which a paging signal failed to be detected for a predetermined number of tuning cycles.

22. A pager receiver according to claim 10, including external programming means for overriding said control means, and wherein said control means responds to programming data identifying preselected channels provided by said external programming means and controls said tuning data generating means in the generation of data words identifying said preselected channels and stores the data words identifying said preselected channels in said memory means.

* * * * *